US012786632B2

(12) United States Patent
Ding et al.

(10) Patent No.: US 12,786,632 B2
(45) Date of Patent: Nov. 3, 2026

(54) AUDIO PROCESSING METHOD AND ELECTRONIC DEVICE

(71) Applicant: Honor Device Co., Ltd., Shenzhen (CN)

(72) Inventors: Xingyun Ding, Shenzhen (CN); Suyun Gao, Shenzhen (CN); Yuwei Feng, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 52 days.

(21) Appl. No.: 18/871,533

(22) PCT Filed: Nov. 28, 2023

(86) PCT No.: PCT/CN2023/134599

§ 371 (c)(1),
(2) Date: Dec. 4, 2024

(87) PCT Pub. No.: WO2024/174638

PCT Pub. Date: Aug. 29, 2024

(65) Prior Publication Data

US 2026/0247074 A1 Aug. 20, 2026

(30) Foreign Application Priority Data

Feb. 22, 2023 (CN) ......................... 202310190424.8

(51) Int. Cl.
*H04R 3/12* (2006.01)
*H04R 3/04* (2006.01)
*H04R 29/00* (2006.01)

(52) U.S. Cl.
CPC ................. *H04R 3/12* (2013.01); *H04R 3/04* (2013.01); *H04R 29/002* (2013.01);
(Continued)

(58) Field of Classification Search
CPC .......... H04R 3/12; H04R 3/04; H04R 29/002; H04R 2430/01; H04R 2499/11; H04R 2499/15
See application file for complete search history.

(56) References Cited

U.S. PATENT DOCUMENTS 9,100,748 B2 8/2015 Hartung et al.
10,063,971 B2 8/2018 Hartung
(Continued)

FOREIGN PATENT DOCUMENTS

CN 101682813 A 3/2010
CN 101682814 A 3/2010
(Continued)

*Primary Examiner* — David L Ton
(74) *Attorney, Agent, or Firm* — WOMBLE BOND DICKINSON (US) LLP

(57) ABSTRACT

First audio data is output by using a first sound producing device, and second audio data is output by using a second sound producing device. First sound energy corresponding to the first audio data in a sound listening region and second sound energy corresponding to the first audio data in a sound leakage region are obtained, and third sound energy corresponding to the second audio data in the sound listening region and fourth sound energy corresponding to the second audio data in the sound leakage region are obtained. An audio optimization coefficient is determined The audio optimization coefficient is used to reduce sound energy corresponding to third audio data that corresponds to the first sound producing device in the sound leakage region and sound energy corresponding to fourth audio data that corresponds to the second sound producing device in the sound leakage region.

20 Claims, 9 Drawing Sheets

(52) U.S. Cl.
CPC ...... *H04R 2430/01* (2013.01); *H04R 2499/11* (2013.01); *H04R 2499/15* (2013.01)

(56) References Cited

U.S. PATENT DOCUMENTS

| | | | |
|---|---|---|---|
| 10,080,088 | B1 | 9/2018 | Yang et al. |
| 10,217,451 | B2 | 2/2019 | Kamdar et al. |
| 10,728,655 | B1 | 7/2020 | Miller et al. |
| 2016/0132285 | A1 | 5/2016 | Hawker et al. |
| 2017/0053641 | A1 | 2/2017 | Kamdar et al. |
| 2021/0204058 | A1 | 7/2021 | Oishi et al. |
| 2023/0008818 | A1 | 1/2023 | Song et al. |
| 2024/0223689 | A1 | 7/2024 | Yan et al. |

FOREIGN PATENT DOCUMENTS

| | | | |
|---|---|---|---|
| CN | 103916810 | A | 7/2014 |
| CN | 103916810 | B | 3/2016 |
| CN | 108141687 | A | 6/2018 |
| CN | 109417676 | A | 3/2019 |
| CN | 111683171 | A | 9/2020 |
| CN | 113347307 | A | 9/2021 |
| CN | 113746975 | A | 12/2021 |
| CN | 113766384 | A | 12/2021 |
| CN | 113824838 | A | 12/2021 |
| CN | 114650335 | A | 6/2022 |
| CN | 114866639 | A | 8/2022 |
| CN | 115052225 | A | 9/2022 |
| CN | 115686425 | A | 2/2023 |
| CN | 117119092 | A | 11/2023 |
| JP | 2000349882 | A | 12/2000 |
| JP | 2009147815 | A | 7/2009 |
| JP | 2016092562 | A | 5/2016 |
| KR | 20130127876 | A | 11/2013 |
| KR | 20190143288 | A | 12/2019 |
| WO | 2015051631 | A1 | 4/2015 |
| WO | 2018048228 | A1 | 3/2018 |
| WO | 2022244258 | A1 | 11/2022 |
| WO | 2023015940 | A1 | 2/2023 |

(a) (b)

AUDIO PROCESSING METHOD AND ELECTRONIC DEVICE

CROSS-REFERENCE TO RELATED APPLICATIONS

This application is a national stage of International Application No. PCT/CN2023/134599, filed on Nov. 28, 2023, which claims priority to Chinese Patent Application No. 202310190424.8, filed on Feb. 22, 2023, both of which are incorporated herein by reference in their entireties.

TECHNICAL FIELD

This application relates to the field of electronic devices, and in particular, to an audio processing method and an electronic device.

BACKGROUND

Currently, voice communication has become an important function of an electronic device such as a mobile phone. In a process in which the electronic device such as the mobile phone interacts with another device to provide a voice communication function for a user, an earpiece of the electronic device such as the mobile phone may convert an audio electrical signal from the another device into a sound signal, and output the sound signal.

As a screen-to-body ratio of the electronic device such as the mobile phone increases, a position of the earpiece is increasingly close to an upper edge of a screen of the electronic device such as the mobile phone. However, when the position of the earpiece is close to the upper edge of the screen of the electronic device such as the mobile phone, a problem of sound leakage in the earpiece may occur when the earpiece outputs a sound signal. The sound leakage in the earpiece causes voice communication content of the user to be heard by a surrounding person, resulting in leakage of user privacy and affecting security of user privacy.

SUMMARY

Embodiments of this application provide an audio processing method and an electronic device, so as to avoid a problem of sound leakage in an earpiece, thereby preventing leakage of user privacy and improving security of user privacy.

To achieve the foregoing objective, the following technical solutions are used in the embodiments of this application.

According to a first aspect, an embodiment of this application provides an audio processing method, which is applied to an electronic device. The electronic device may include at least two sound producing devices, and the at least two sound producing devices may include a first sound producing device and a second sound producing device. The audio processing method may include: outputting first audio data by using the first sound producing device, and outputting second audio data by using the second sound producing device; obtaining first sound energy corresponding to the first audio data in a sound listening region and second sound energy corresponding to the first audio data in a sound leakage region, and obtaining third sound energy corresponding to the second audio data in the sound listening region and fourth sound energy corresponding to the second audio data in the sound leakage region; and determining an audio optimization coefficient based on the first sound energy corresponding to the sound listening region, the second sound energy corresponding to the sound leakage region, the third sound energy corresponding to the sound listening region, and the fourth sound energy corresponding to the sound leakage region, where the audio optimization coefficient is used to reduce sound energy corresponding to third audio data that corresponds to the first sound producing device in the sound leakage region and sound energy corresponding to fourth audio data that corresponds to the second sound producing device in the sound leakage region.

Based on the method according to the first aspect, the electronic device may determine the audio optimization coefficient based on the sound energy corresponding to the sound listening region and the sound energy corresponding to the sound leakage region. Using the audio optimization coefficient can reduce sound energy corresponding to audio data in the sound leakage region. In other words, before the electronic device outputs the audio data, the electronic device may perform optimization processing on the output audio data, so that sound energy corresponding to the output audio data in the sound leakage region is reduced. This can avoid a problem of sound leakage in the earpiece of the electronic device in the sound leakage region, thereby preventing leakage of user privacy and improving security of user privacy.

With reference to the first aspect, in another possible implementation, the audio optimization coefficient may include a first optimization coefficient and a second optimization coefficient. The determining an audio optimization coefficient based on the first sound energy corresponding to the sound listening region, the second sound energy corresponding to the sound leakage region, the third sound energy corresponding to the sound listening region, and the fourth sound energy corresponding to the sound leakage region may include: determining a first sound energy contrast between the first sound energy and the second sound energy; determining the first optimization coefficient based on the first sound energy contrast; determining a second sound energy contrast between the third sound energy and the fourth sound energy; and determining the second optimization coefficient based on the second sound energy contrast.

Based on this possible implementation, the electronic device may accurately determine an audio optimization coefficient based on a sound energy contrast between the sound energy corresponding to the sound listening region and the sound energy corresponding to the sound leakage region, so that sound energy corresponding to the audio data in the sound leakage region can be reduced by using the audio optimization coefficient. This can avoid a problem of sound leakage in the earpiece of the electronic device in the sound leakage region, thereby preventing leakage of user privacy and improving security of user privacy.

With reference to the first aspect, in another possible implementation, the determining the first optimization coefficient based on the first sound energy contrast may include: determining a value corresponding to the maximum first sound energy contrast as the first optimization coefficient; and the determining the second optimization coefficient based on the second sound energy contrast may include: determining a value corresponding to the maximum second sound energy contrast as the second optimization coefficient.

Based on this possible implementation, the electronic device determines the value corresponding to the maximum sound energy contrast as the audio optimization coefficient. Because the value corresponding to the maximum sound energy contrast is determined as the audio optimization coefficient, sound energy corresponding to the audio data in the sound leakage region can be reduced by using the audio optimization coefficient. This can avoid a problem of sound leakage in the earpiece of the electronic device, thereby preventing leakage of user privacy and improving security of user privacy.

With reference to the first aspect, in another possible implementation, the obtaining first sound energy corresponding to the first audio data in a sound listening region and second sound energy corresponding to the first audio data in a sound leakage region may include: obtaining a first transfer function corresponding to the first audio data in the sound listening region and obtaining a second transfer function corresponding to the first audio data in the sound leakage region; determining, based on the first transfer function corresponding to the sound listening region, the first sound energy corresponding to the first audio data in the sound listening region; and determining, based on the second transfer function corresponding to the sound leakage region, the second sound energy corresponding to the first audio data in the sound leakage region.

Based on this possible implementation, the electronic device may determine, by using the first transfer function corresponding to the first audio data in the sound listening region and the second transfer function corresponding to the first audio data in the sound leakage region, the first sound energy corresponding to the first audio data in the sound listening region and the second sound energy corresponding to the first audio data in the sound leakage region, so that the first audio optimization coefficient can be determined based on the first sound energy corresponding to the sound listening region and the second sound energy corresponding to the sound leakage region.

With reference to the first aspect, in another possible implementation, the obtaining a first transfer function corresponding to the first audio data in the sound listening region may include: obtaining a transfer function of the first audio data at each sampling point in the sound listening region; and determining, based on the transfer function of the first audio data at each sampling point in the sound listening region, the first transfer function corresponding to the first audio data in the sound listening region; and the obtaining a second transfer function corresponding to the first audio data in the sound leakage region may include: obtaining a transfer function of the first audio data at each sampling point in the sound leakage region; and determining, based on the transfer function of the first audio data at each sampling point in the sound leakage region, the second transfer function corresponding to the first audio data in the sound leakage region.

Based on this possible implementation, the electronic device may determine, by using the transfer function of the first audio data at each sampling point in the sound listening region and the transfer function of the first audio data at each sampling point in the sound leakage region, a transfer function corresponding to the first audio data in the sound listening region and a transfer function corresponding to the first audio data in the sound leakage region, so that the first sound energy corresponding to the sound listening region and the second sound energy corresponding to the sound leakage region can be determined.

With reference to the first aspect, in another possible implementation, the determining, based on the transfer function of the first audio data at each sampling point in the sound listening region, the first transfer function corresponding to the first audio data in the sound listening region may include: determining a weight corresponding to each sampling point in the sound listening region; and determining, based on the weight corresponding to each sampling point in the sound listening region and the transfer function of each sampling point in the sound listening region, the first transfer function corresponding to the first audio data in the sound listening region.

Based on this possible implementation, the electronic device may accurately determine, by using the weight corresponding to each sampling point in the sound listening region, the first transfer function corresponding to the first audio data in the sound listening region, so that the first sound energy corresponding to the sound listening region and the second sound energy corresponding to the sound leakage region can be determined.

With reference to the first aspect, in another possible implementation, the audio processing method may further include: optimizing, based on the first optimization coefficient, a first filter corresponding to the first sound producing device, and filtering the third audio data by using the optimized first filter to obtain the filtered third audio data; optimizing, based on the second optimization coefficient, a second filter corresponding to the second sound producing device, and filtering the fourth audio data by using the optimized second filter to obtain the filtered fourth audio data; and outputting the filtered third audio data by using the first sound producing device, and outputting the filtered fourth audio data by using the second sound producing device.

Based on this possible implementation, when the electronic device outputs the filtered audio data by using the sound producing device, the filter corresponding to the sound producing device is optimized by using the audio optimization coefficient, and the filter filters the audio data to obtain the filtered audio data, so that sound energy corresponding to the audio data in the sound leakage region is reduced by using the audio optimization coefficient. This can avoid a problem of sound leakage in the earpiece of the electronic device, thereby preventing leakage of user privacy and improving security of user privacy.

With reference to the first aspect, in another possible implementation, before the obtaining first sound energy corresponding to the first audio data in a sound listening region and second sound energy corresponding to the first audio data in a sound leakage region, and obtaining third sound energy corresponding to the second audio data in the sound listening region and fourth sound energy corresponding to the second audio data in the sound leakage region, the foregoing audio processing method may further include: determining a use scenario in which the electronic device outputs the first audio data and the second audio data; and determining the sound listening region and the sound leakage region based on the use scenario of the first audio data and the second audio data.

Based on this possible implementation, the electronic device determines the sound listening region and the sound leakage region by using the use scenario in which the first audio data and the second audio data are output, and can determine an audio optimization coefficient corresponding to the use scenario of the first audio data and the second audio data, so that the audio optimization coefficient corresponding to the use scenario of the first audio data and the second audio data can be determined. This avoids a problem of sound leakage in the earpiece in the use scenario in which the electronic device outputs the first audio data and the second audio data, thereby preventing leakage of user privacy and improving security of user privacy.

With reference to the first aspect, in another possible implementation, the use scenario of the third audio data and the fourth audio data is the same as the use scenario of the first audio data and the second audio data.

Based on this possible implementation, because the use scenario in which the electronic device outputs the first audio data and the second audio data is the same as the use scenario in which the electronic device outputs the third audio data and the fourth audio data, in the use scenario in which the electronic device outputs the third audio data and the fourth audio data, the audio optimization coefficient corresponding to the use scenario of the first audio data and the second audio data can be used to avoid a problem of sound leakage in the earpiece in the use scenario in which the electronic device outputs the third audio data and the fourth audio data, thereby preventing leakage of user privacy and improving security of user privacy.

With reference to the first aspect, in another possible implementation, the at least two sound producing devices may include at least one of the earpiece of the electronic device, a speaker of the electronic device, or a screen sound producing apparatus of the electronic device.

Based on this possible implementation, because the at least two sound producing devices may include at least one of the earpiece of the electronic device and the speaker of the electronic device, when the sound producing device of the electronic device includes the earpiece of the electronic device and the speaker of the electronic device, a problem of sound leakage in the earpiece of the electronic device can be avoided, thereby preventing leakage of user privacy and improving security of user privacy, and further, sound field playback may be implemented by using the earpiece of the electronic device and the speaker of the electronic device.

With reference to the first aspect, in another possible implementation, the first sound producing device may be the earpiece of the electronic device, and the second sound producing device may be the screen sound producing apparatus of the electronic device.

Based on this possible implementation, when the sound producing device of the electronic device includes the earpiece of the electronic device and the screen sound producing apparatus of the electronic device, a problem of sound leakage in the earpiece of the electronic device can be avoided, thereby preventing leakage of user privacy and improving security of user privacy, and further, sound field playback may be implemented by using the earpiece of the electronic device and the speaker of the electronic device.

According to a second aspect, an embodiment of this application provides an audio processing apparatus. The audio processing apparatus may be applied to an electronic device to implement the method in the first aspect. A function of the audio processing apparatus may be implemented by using hardware, or may be implemented by executing corresponding software by hardware. The hardware or the software includes one or more modules corresponding to the foregoing function, for example, an output module, an obtaining module, and a determining module.

The output module may be configured to output first audio data by using a first sound producing device, and output second audio data by using a second sound producing device.

The obtaining module may be configured to obtain first sound energy corresponding to the first audio data in a sound listening region and second sound energy corresponding to the first audio data in a sound leakage region, and obtain third sound energy corresponding to the second audio data in the sound listening region and fourth sound energy corresponding to the second audio data in the sound leakage region.

The determining module may be configured to determine an audio optimization coefficient based on the first sound energy corresponding to the sound listening region, the second sound energy corresponding to the sound leakage region, the third sound energy corresponding to the sound listening region, and the fourth sound energy corresponding to the sound leakage region, where the audio optimization coefficient is used to reduce sound energy corresponding to third audio data that corresponds to the first sound producing device in the sound leakage region and sound energy corresponding to fourth audio data that corresponds to the second sound producing device in the sound leakage region.

With reference to the second aspect, in another possible implementation, the determining module may be further configured to determine a first sound energy contrast between the first sound energy and the second sound energy.

The determining module may be further configured to determine a first optimization coefficient based on the first sound energy contrast.

The determining module may be further configured to determine a second sound energy contrast between the third sound energy and the fourth sound energy.

The determining module may be further configured to determine a second optimization coefficient based on the second sound energy contrast.

With reference to the second aspect, in another possible implementation, the determining module may be further configured to determine a value corresponding to the maximum first sound energy contrast as the first optimization coefficient.

The determining module may be further configured to determine a value corresponding to the maximum second sound energy contrast as the second optimization coefficient.

With reference to the second aspect, in another possible implementation, the obtaining module may be further configured to obtain a first transfer function corresponding to the first audio data in the sound listening region, and obtain a second transfer function corresponding to the first audio data in the sound leakage region.

The determining module may be further configured to determine, based on the first transfer function corresponding to the sound listening region, the first sound energy corresponding to the first audio data in the sound listening region.

The determining module may be further configured to determine, based on the second transfer function corresponding to the sound leakage region, the second sound energy corresponding to the first audio data in the sound leakage region.

With reference to the second aspect, in another possible implementation, the obtaining module may be further configured to obtain a transfer function of the first audio data at each sampling point in the sound listening region.

The determining module may be further configured to determine, based on the transfer function of the first audio data at each sampling point in the sound listening region, the first transfer function corresponding to the first audio data in the sound listening region.

The obtaining module may be further configured to obtain a transfer function of the first audio data at each sampling point in the sound leakage region.

The determining module may be further configured to determine, based on the transfer function of the first audio data at each sampling point in the sound leakage region, the second transfer function corresponding to the first audio data in the sound leakage region.

With reference to the second aspect, in another possible implementation, the determining module may be further configured to determine a weight corresponding to each sampling point in the sound listening region.

The determining module may be further configured to determine, based on the weight corresponding to each sampling point in the sound listening region and the transfer function of each sampling point in the sound listening region, the first transfer function corresponding to the first audio data in the sound listening region.

With reference to the second aspect, in another possible implementation, the audio processing apparatus may further include an optimization module. The optimization module may be configured to optimize, based on the first optimization coefficient, a first filter corresponding to the first sound producing device, and filter the third audio data by using the optimized first filter to obtain the filtered third audio data.

The optimization module may be further configured to optimize, based on the second optimization coefficient, a second filter corresponding to the second sound producing device, and filter the fourth audio data by using the optimized second filter to obtain the filtered fourth audio data.

The output module may be further configured to output the filtered third audio data by using the first sound producing device, and output the filtered fourth audio data by using the second sound producing device.

With reference to the second aspect, in another possible implementation, the determining module may be further configured to determine a use scenario in which the electronic device outputs the first audio data and the second audio data.

The determining module may be further configured to determine the sound listening region and the sound leakage region based on the use scenario of the first audio data and the second audio data.

With reference to the second aspect, in another possible implementation, a use scenario of the third audio data and the fourth audio data is the same as the use scenario of the first audio data and the second audio data.

With reference to the second aspect, in another possible implementation, the at least two sound producing devices include at least one of the earpiece of the electronic device, the speaker of the electronic device, or the screen sound producing apparatus of the electronic device.

With reference to the second aspect, in another possible implementation, the first sound producing device is the earpiece of the electronic device, and the second sound producing device is the screen sound producing apparatus of the electronic device.

According to a third aspect, an audio processing device is provided. The audio processing device has a function of implementing the method according to the first aspect. The function may be implemented by using hardware, or may be implemented by executing corresponding software by hardware. The hardware or the software includes one or more modules corresponding to the foregoing function.

According to a fourth aspect, an audio processing device is provided. The audio processing device includes a processor and a memory. The memory is configured to store computer-executable instructions. When the audio processing device runs, the processor executes the computer-executable instructions stored in the memory, to enable the audio processing device to perform the audio processing method according to any item of the first aspect.

According to a fifth aspect, an audio processing device is provided. The audio processing device includes a processor. The processor is configured to: couple to a memory, and after reading instructions in the memory, perform the audio processing method according to any item of the first aspect based on the instructions.

According to a sixth aspect, an embodiment of this application provides a computer-readable storage medium, where the computer-readable storage medium stores computer program instructions. When the computer program instructions are executed by an electronic device, the electronic device is enabled to implement the audio processing method according to any one of the first aspect or the possible implementations of the first aspect.

According to a seventh aspect, an embodiment of this application provides a computer program product, including computer-readable code. When the computer-readable code is run on an electronic device, the electronic device is enabled to implement the audio processing method according to any one of the first aspect or the possible implementations of the first aspect.

According to an eighth aspect, an apparatus (for example, the apparatus may be a chip system) is provided. The apparatus includes a processor, configured to support an electronic device in implementing a function in the first aspect. In a possible design, the apparatus further includes a memory. The memory is configured to store program instructions and data that are necessary for the electronic device. When the apparatus is a chip system, the apparatus may include a chip, or may include a chip and another discrete component.

It should be understood that, for beneficial effects of the second aspect to the eighth aspect, refer to related descriptions in the first aspect. Details are not described herein again.

DESCRIPTION OF EMBODIMENTS

The following clearly describes the technical solutions in embodiments of this application with reference to the accompanying drawings in the embodiments of this application. Clearly, the described embodiments are merely some rather than all of the embodiments of this application. Based on the embodiments of this application, all other embodiments obtained by a person of ordinary skill in the art without creative efforts fall within the protection scope of this application.

Terms “first” and “second” are merely used for description purposes, and shall not be understood as indicating or implying relative importance or implicitly indicating a quantity of technical features indicated. Therefore, a feature defined as “first” or “second” may explicitly or implicitly include one or more of the features. In the descriptions of this application, unless otherwise stated, “a plurality of” means two or more.

Currently, voice communication has become an important function of an electronic device such as a mobile phone. In a process in which the electronic device such as the mobile phone interacts with another device to provide a voice communication function for a user, an earpiece of the electronic device such as the mobile phone may convert an audio electrical signal from the another device into a sound signal, and output the sound signal.

As a screen-to-body ratio of the electronic device such as the mobile phone increases, a position of the earpiece is increasingly close to an upper edge of a screen of the electronic device such as the mobile phone. However, when the position of the earpiece is close to the upper edge of the screen of the electronic device such as the mobile phone, a problem of sound leakage in the earpiece may occur when the earpiece outputs a sound signal. The sound leakage in the earpiece causes voice communication content of the user to be heard by a surrounding person, resulting in leakage of user privacy and affecting security of user privacy.

Figure 1:
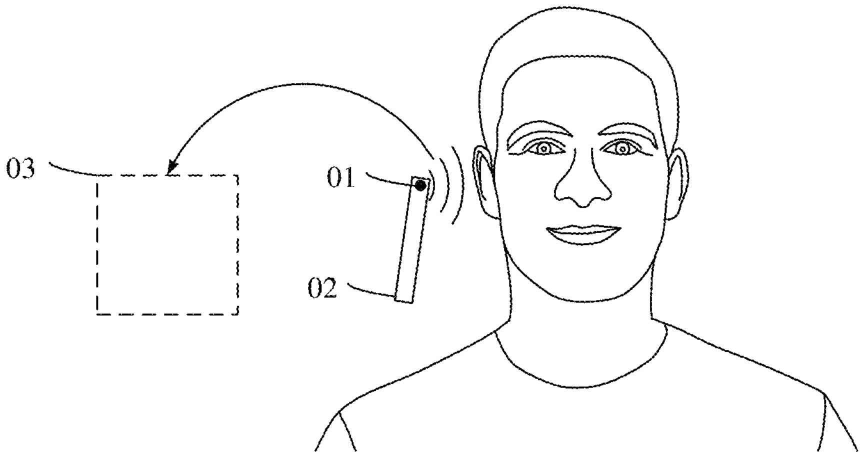
FIG. 1 is a schematic diagram 1 of sound leakage in an earpiece of an electronic device.

For example, as shown in FIG. 1, for a mobile phone 02 in which an earpiece 01 is located on an upper edge of a screen, when a user makes a call by using the mobile phone 02, a sound signal output by the earpiece 01 produces a sound to various directions through a sound output hole at the top of the mobile phone 02. The sound signal output by the earpiece 01 may be heard on a side of an ear of the user, and the sound signal output by the earpiece 01 may also be heard on a side away from the ear of the user. For example, in a region 03 in FIG. 1, the sound signal output by the earpiece 01 is also transferred to the region, that is, the sound signal output by the earpiece 01 is also heard in the region 03. Therefore, when the earpiece 01 is located near the upper edge of the screen of the mobile phone 02, the sound signal output by the earpiece 01 encounters a problem of sound leakage in the earpiece 01, that is, the sound signal output by the earpiece 01 may be heard in the region 03. In other words, another user may hear, in the region 03, the sound signal output by the earpiece 01. This causes voice communication content of the user to be heard by a surrounding person, resulting in leakage of user privacy and affecting security of user privacy.

To resolve a problem of sound leakage in the earpiece caused when the position of the earpiece is close to the upper edge of the screen of the electronic device such as the mobile phone, in a conventional technology, the earpiece is usually arranged at a relatively lower position on the screen of the electronic device such as the mobile phone. For a solution in which the earpiece is arranged at a relatively lower position on the screen of the electronic device such as the mobile phone, a problem of sound leakage in the earpiece may be alleviated from a perspective of structural design. However, in such a solution in which the earpiece is arranged at a relatively lower position on the screen of the electronic device such as the mobile phone, a screen-to-body ratio of the electronic device such as the mobile phone decreases, and consequently a relative ratio of the screen to a front panel area of the electronic device such as the mobile phone decreases, resulting in low user experience. Therefore, in such a solution in which the earpiece is arranged at a relatively lower position on the screen of the electronic device such as the mobile phone, the problem of sound leakage in the earpiece caused when the position of the earpiece is close to the upper edge of the screen of the electronic device such as the mobile phone is not well resolved.

To resolve the problem of sound leakage in the earpiece caused when the position of the earpiece is close to the upper edge of the screen of the electronic device such as the mobile phone, in the conventional technology, alternatively, when the user performs voice communication by using the electronic device such as the mobile phone, a first sound signal may be played by using the earpiece at the top of the electronic device such as the mobile phone, and a second sound signal may be played by using the speaker at the bottom of the electronic device such as the mobile phone, where the second sound signal and the first sound signal have opposite phases. Because the second sound signal and the first sound signal have opposite phases, these two sound waves may cancel each other during propagation, thereby cancelling out sound leakage in the earpiece of the electronic device and reducing leakage of voice communication content.

In such a solution in which the first sound signal is played by using the earpiece and the second sound signal having a phase that is opposite to a phase of the first sound signal is played by using the speaker, the sound leakage in the earpiece of the electronic device can be cancelled out. However, in this solution, because the second sound signal and the first sound signal have opposite phases, this solution cannot ensure that the user hears a sound signal by using the earpiece to achieve an effect of sound field playback. In other words, this solution cannot ensure auditory perception of the user while cancelling out the sound leakage in the earpiece of the electronic device. Therefore, in this solution in which the first sound signal is played by using the earpiece and the second sound signal having a phase that is opposite to a phase of the first sound signal is played by using the speaker, the problem of sound leakage in the earpiece caused when the position of the earpiece is close to the upper edge of the screen of the electronic device such as the mobile phone is not well resolved, either.

In addition, with development of the electronic device such as the mobile phone, people have increasingly diversified requirements on functions of the electronic device such as the mobile phone. For example, the user has an increasingly high requirement on quality of the sound signal output by the earpiece of the electronic device such as the mobile phone. For example, the user expects that the heard sound signal can achieve an effect of sound field playback. The electronic device such as the mobile phone may restore a stereoscopic sense of a sound in the nature through sound field playback, and may restore the stereo feeling of the sound to some extent, thereby providing a playback sound that has a spatial distribution characteristic such as a sense of hierarchical orientation to some extent.

Generally, the electronic device such as the mobile phone may include at least two sound producing devices (such as the earpiece and the screen sound producing apparatus), so that the electronic device such as the mobile phone can implement sound field playback by using the at least two sound producing devices. The screen sound producing apparatus is an apparatus that can produce a sound through vibration of the screen. The screen sound producing apparatus may be located in a lower part of the screen of the electronic device such as the mobile phone.

Figure 2:
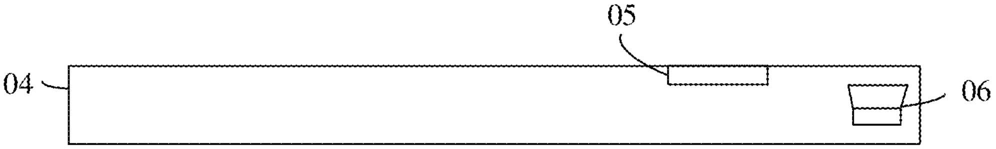
FIG. 2 is a schematic diagram of a hardware structure of an electronic device.

For example, as shown in FIG. 2, the mobile phone 04 may include two sound producing devices, that is, a screen sound producing apparatus 05 and an earpiece 06. The earpiece 06 may be located on an upper edge of the screen of the mobile phone 04, and the screen sound producing apparatus 05 may be located in a lower part of the screen of the mobile phone 04, and is close to a position of the earpiece 06. When the user makes a call by using the mobile phone 04, the earpiece 06 may output a sound signal. The screen sound producing apparatus 05 may output a sound signal through vibration of the screen of the mobile phone 04, that is, the earpiece 06 and the screen sound producing apparatus 05 may simultaneously output a sound signal, so that an effect of sound field playback can be achieved.

However, when the electronic device such as the mobile phone implements sound field playback by using at least two sound producing devices, there is still a problem of sound leakage in the earpiece caused when the position of the earpiece is close to the upper edge of the screen of the electronic device such as the mobile phone.

Figure 3:
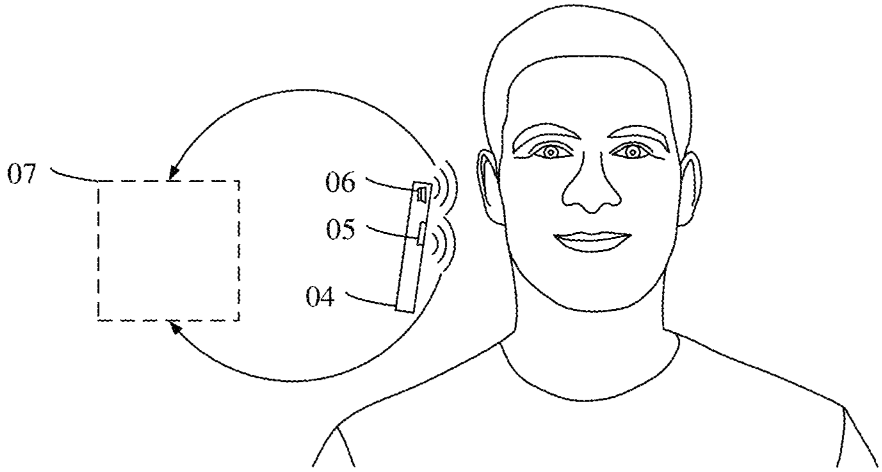
FIG. 3 is a schematic diagram 2 of sound leakage in an earpiece of an electronic device.

For example, as shown in FIG. 3, when the mobile phone 04 includes two sound producing devices, namely, the screen sound producing apparatus 05 and the earpiece 06, the earpiece 06 may be located on the upper edge of the screen of the mobile phone 04, and the screen sound producing apparatus 05 may be located in the lower part of the screen of the mobile phone 04, and be close to the position of the earpiece 06. When the user makes a call by using the mobile phone 04, the earpiece 06 and the screen sound producing apparatus 05 may simultaneously output a sound signal, so that an effect of sound field playback can be achieved.

However, the sound signal output by the earpiece 06 produces a sound to various directions through a sound output hole at the top of the mobile phone 04, and the sound signal output by the screen sound producing apparatus 05 produces a sound to various directions by using the screen of the mobile phone 04. To be specific, the sound signals output by the earpiece 06 and the screen sound producing apparatus 05 are heard on a side of an ear of the user, and the sound signals output by the earpiece 06 and the screen sound producing apparatus 05 are also heard on a side away from the ear of the user. For example, the sound signals output by the earpiece 06 and the screen sound producing apparatus 05 are also heard in a region 07 in FIG. 3. Therefore, when the earpiece 06 and the screen sound producing apparatus 05 simultaneously output a sound signal, the sound signals output by the earpiece 06 and the screen sound producing apparatus 05 may be heard in the region 07. In other words, another user may hear, in the region 07, the sound signals output by the earpiece 06 and the screen sound producing apparatus 05. This causes voice communication content of the user to be heard by a surrounding person, resulting in leakage of user privacy and affecting security of user privacy.

To resolve the foregoing problem, an embodiment of this application provides an audio processing method, which is applied to an electronic device. The electronic device may achieve an effect of sound field playback by using at least two sound producing devices (such as an earpiece and a speaker). In addition, the electronic device may obtain sound energy of a sound listening region and sound energy of a sound leakage region, and may obtain, based on the sound energy of the sound listening region and the sound energy of the sound leakage region, an optimization coefficient corresponding to the at least two sound producing devices. The optimization coefficient may be a maximum value of a sound energy contrast between the sound energy of the sound listening region and the sound energy of the sound leakage region. The optimization coefficient may be used to optimize playback filters respectively corresponding to the at least two sound producing devices. Therefore, when the user makes a call by using the electronic device, the optimized playback filters may respectively filter input signals (namely, audio data) of the at least two sound producing devices, and the at least two sound producing devices may output the filtered input signals. The output signals of the at least two sound producing devices may achieve an effect of sound field playback in the sound listening region.

Because the optimization coefficient of the playback filters corresponding to the at least two sound producing devices is the maximum value of the sound energy contrast between the sound energy of the sound listening region and the sound energy of the sound leakage region, the optimized playback filters can reduce the sound energy of the sound producing device in the sound leakage region. In other words, before the electronic device outputs the audio data, the electronic device may perform optimization processing on the output audio data, so that sound energy corresponding to the output audio data in the sound leakage region is reduced. In addition, the output signals of the at least two sound producing devices may also implement interference cancellation in the sound leakage region. Therefore, the solution of this application can prevent sound leakage in the sound leakage region. In addition, the optimized playback filters may keep the sound energy of the sound listening region unchanged. In other words, in the solution of this application, the sound energy of the sound leakage region can be reduced while sound field playback can be implemented by using the at least two sound producing devices. In other words, the solution of this application can ensure auditory perception of the user while preventing sound leakage.

The following describes the audio processing method provided in embodiments of this application.

The audio processing method provided in the embodiments of this application may be applied to an electronic device. In some embodiments, the electronic device may be an electronic device with an application, for example, a mobile phone, a tablet computer, a handheld computer, a personal computer (personal computer, PC), a cellular phone, a personal digital assistant (personal digital assistant, PDA), or a wearable device. A specific form of the electronic device is not limited herein in the embodiments of this application.

Figure 4:
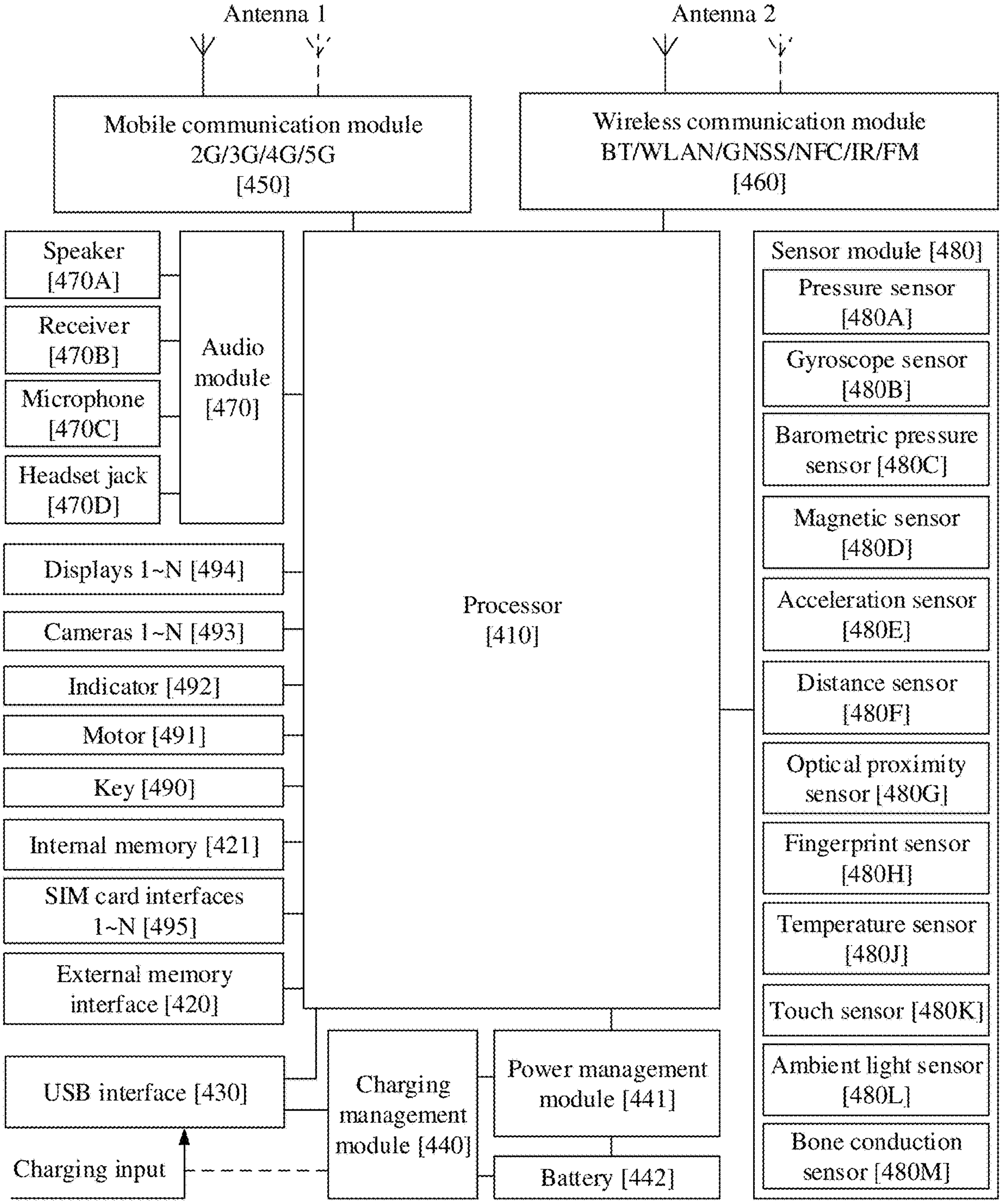
FIG. 4 is a schematic diagram of a hardware structure of an electronic device according to an embodiment of this application.

For example, the electronic device is the mobile phone. FIG. 4 is a schematic diagram of a structure of an electronic device according to an embodiment of this application.

As shown in FIG. 4, the electronic device may include a processor 410, an external memory interface 420, an internal memory 421, a universal serial bus (universal serial bus, USB) interface 430, a charging management module 440, a power management module 441, a battery 442, an antenna 1, an antenna 2, a mobile communication module 450, a wireless communication module 460, an audio module 470, a speaker 470A, a receiver 470B, a microphone 470C, a headset jack 470D, a sensor module 480, a key 490, a motor 491, an indicator 492, a camera 493, a display 494, a subscriber identity module (subscriber identification module, SIM) card interface 495, and the like. The sensor module 480 may include a pressure sensor 480A, a gyroscope sensor 480B, a barometric pressure sensor 480C, a magnetic sensor 480D, an acceleration sensor 480E, a distance sensor 480F, an optical proximity sensor 480G, a fingerprint sensor 480H, a temperature sensor 480J, a touch sensor 480K, an ambient light sensor 480L, a bone conduction sensor 480M, and the like.

It may be understood that the structure shown in this embodiment does not constitute a specific limitation on the electronic device. In some other embodiments, the electronic device may include more or fewer components than those shown in the figure, combine some components, split some components, or have different component arrangements. The components shown in the figure may be implemented by using hardware, software, or a combination of software and hardware.

The processor 410 may include one or more processing units. For example, the processor 410 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device. The controller may generate an operation control signal based on instruction operation code and a timing signal, to complete control of instruction fetching and instruction execution.

The memory may be further disposed in the processor 410, and is configured to store instructions and data. In some embodiments, the memory in the processor 410 is a cache memory. The memory may store instructions or data just used or cyclically used by the processor 410. If the processor 410 needs to use the instructions or the data again, the processor may directly invoke the instructions or the data from the memory. This avoids repeated access and reduces a wait time of the processor 410, thereby improving efficiency of a system.

In some embodiments, the processor 410 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

A wireless communication function of the electronic device may be implemented by using the antenna 1, the antenna 2, the mobile communication module 450, the wireless communication module 460, the modem processor, the baseband processor, and the like.

The antenna 1 and the antenna 2 are configured to transmit and receive an electromagnetic wave signal. Each antenna in the electronic device may be configured to cover one or more communication frequency bands. Different antennas may be further multiplexed to improve antenna utilization. For example, the antenna 1 may be multiplexed into a diversity antenna of a wireless local area network. In some other embodiments, the antenna may be used together with a tuning switch.

The mobile communication module 450 may provide a solution for wireless communication that is applied to the electronic device and that includes 2G/3G/4G/5G and the like. The mobile communication module 450 may include at least one filter, switch, power amplifier, low noise amplifier (low noise amplifier, LNA), and the like. The mobile communication module 450 may receive an electromagnetic wave by using the antenna 1, perform processing such as filtering and amplification on the received electromagnetic wave, and then transmit a processed electromagnetic wave to the modem processor for demodulation. The mobile communication module 450 may further amplify a signal modulated by the modem processor, and convert, by using the antenna 1, the signal into an electromagnetic wave for radiation. In some embodiments, at least some functional modules of the mobile communication module 250 may be disposed in the processor 410. In some embodiments, at least some functional modules of the mobile communication module 450 may be disposed in a same device as at least some modules of the processor 410.

The wireless communication module 460 may provide a solution for wireless communication that is applied to the electronic device and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 460 may be one or more devices integrating at least one communication processing module. The wireless communication module 460 receives an electromagnetic wave by using the antenna 2, performs frequency modulation and filtering processing on an electromagnetic wave signal, and sends a processed signal to the processor 410. The wireless communication module 460 may further receive a to-be-sent signal from the processor 410, perform frequency modulation and amplification on the signal, and convert, by using the antenna 2, the signal into an electromagnetic wave for radiation.

In some embodiments, in the electronic device, the antenna 1 and the mobile communication module 450 are coupled, and the antenna 2 and the wireless communication module 460 are coupled, so that the electronic device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like.

The electronic device implements a display function by using the GPU, the display 494, the application processor, and the like. The GPU is a microprocessor for image processing, and is connected to the display 494 and the application processor. The GPU is configured to perform mathematical and geometric calculation for graphics rendering. The processor 410 may include one or more GPUs, and the GPU executes program instructions to generate or change displayed information.

The display 494 is configured to display an image, a video, and the like. The display 494 includes a display panel. The display panel may be a liquid crystal display (liquid crystal display, LCD), an organic light-emitting diode (organic light-emitting diode, OLED), an active-matrix organic light emitting diode or an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device may include 1 or N displays 494, where N is a positive integer greater than 1.

The electronic device can implement a photographing function by using the ISP, the camera 493, the video codec, the GPU, the display 494, the application processor, and the like. In some embodiments, the electronic device may include 1 or N cameras 493, where N is a positive integer greater than 1.

The internal memory 421 may be configured to store computer-executable program code, and the executable program code includes instructions. The processor 410 performs various function applications and data processing of the electronic device by running the instructions stored in the internal memory 421. The internal memory 421 may include a program storage area and a data storage area. The program storage area may store an operating system, an application required by at least one function (for example, a sound playing function or an image playing function), and the like. The data storage area may store data (for example, audio data and a phone book) and the like created during use of the electronic device. In addition, the internal memory 421 may include a high-speed random access memory, and may further include a non-volatile memory, for example, at least one magnetic disk storage device, a flash memory device, or a universal flash storage (universal flash storage, UFS).

The acceleration sensor 480E may periodically collect acceleration data of the electronic device at a specific frequency. For example, magnitudes of acceleration of the electronic device in various directions (which are usually an X-axis direction, a Y-axis direction, and a Z-axis direction) may be collected.

Certainly, it may be understood that FIG. 4 shows merely an example description when a form of the electronic device is a mobile phone. If the electronic device is in another device form such as a tablet computer, a handheld computer, a PC, a PDA, or a wearable device (for example, a smartwatch or a smart band), the structure of the electronic device may include fewer structures than those shown in FIG. 2 or may include more structures than those shown in FIG. 2. This is not limited herein.

In some examples, to enable the electronic device to achieve an effect of sound field playback, the electronic device may further include a playback filter bank. The playback filter bank may include a plurality of playback filters. The playback filters may be in a one-to-one correspondence with the sound producing devices that implement sound field playback, so as to filter input signals of the sound producing devices that implement sound field playback.

It may be understood that a function of the electronic device usually needs to be implemented based on cooperation of software in addition to support of hardware.

A software system of the electronic device may use a layered architecture, an event-driven architecture, a microkernel architecture, a microservice architecture, or a cloud architecture. In this embodiment of this application, an Android system with the layered architecture is used as an example to describe a software structure of the electronic device.

Figure 5:
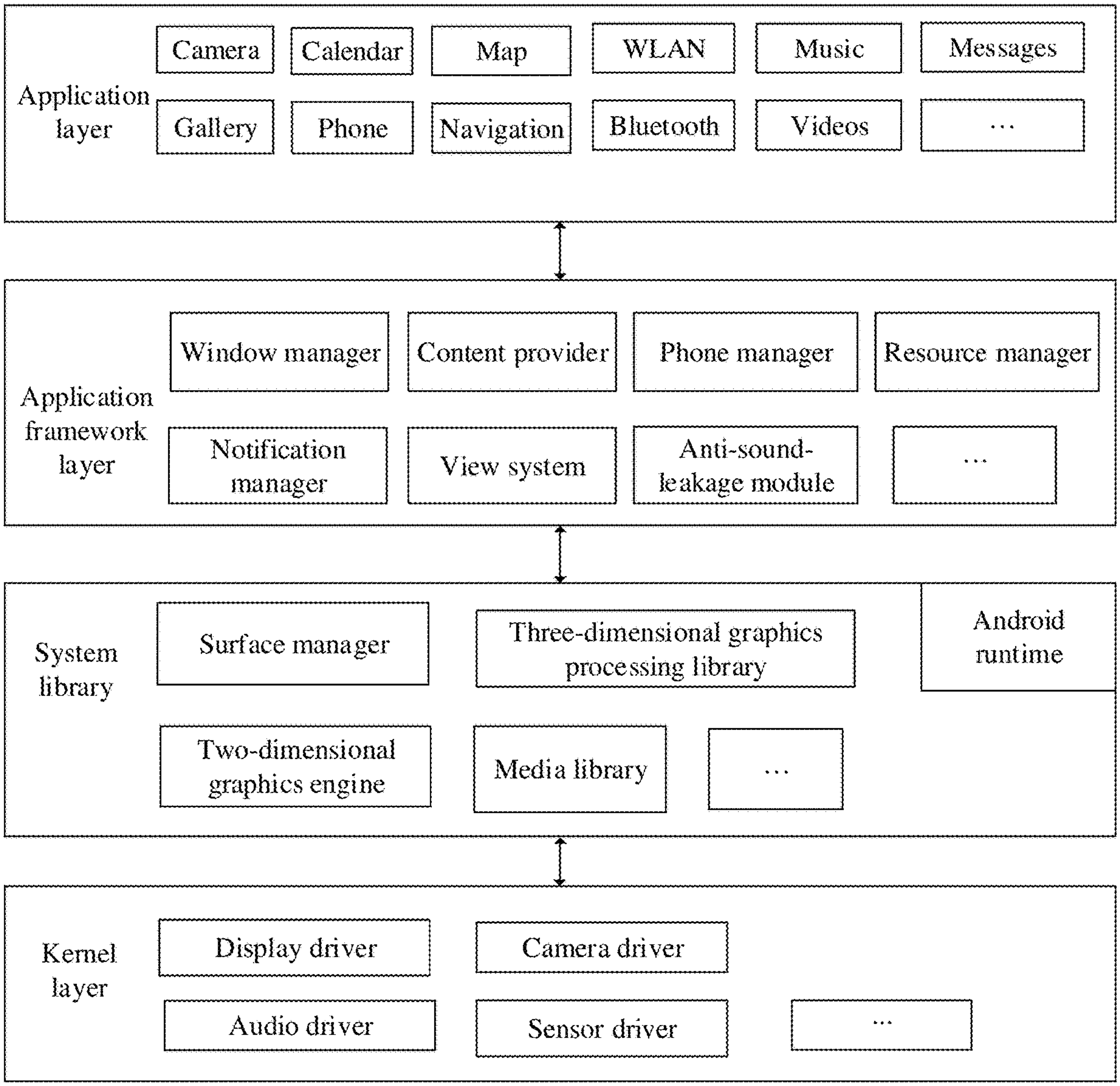
FIG. 5 is a schematic diagram of a software structure of an electronic device according to an embodiment of this application.

FIG. 5 is a block diagram of a software structure of an electronic device according to an embodiment of this application.

In the layered architecture, software is divided into several layers, and each layer has a clear role and task. The layers communicate with each other by using software interfaces. In some embodiments, the Android system is divided into four layers: an application layer, an application framework layer, an Android runtime (Android runtime) and system library (which may also be referred to as a Native layer), and a kernel layer from top to bottom.

The application layer may include a series of application packages. As shown in FIG. 5, the application packages may include applications such as Camera, Gallery, Calendar, Phone, Map, Navigation, WLAN, Bluetooth, Music, Videos, and Messages. The application framework layer provides an application programming interface (application programming interface, API) and a programming framework for the applications at the application layer. The application framework layer includes some predefined functions.

As shown in FIG. 5, the application framework layer may include a window manager, a content provider, a view system, a phone manager, a resource manager, a notification manager, and the like.

The window manager is configured to manage a window program. The window manager may obtain a size of a display, determine whether a status bar exists, lock a screen, take a screenshot, and the like.

The content provider is configured to store and obtain data, and enable the data to be accessible by an application. The data may include a video, an image, audio, calls that are made and answered, a browsing history and a bookmark, a phone book, and the like.

The view system includes visual controls, for example, a control for displaying a text and a control for displaying a picture. The view system may be configured to construct an application. A display interface may include one or more views. For example, a display interface including an SMS message notification icon may include a view for displaying a text and a view for displaying a picture.

The phone manager is configured to provide a communication function of the electronic device, for example, call status management (including answering, hanging up, and the like).

The resource manager provides various resources for an application, for example, a localized string, an icon, a picture, a layout file, and a video file.

The notification manager enables an application to display notification information in a status bar, and may be configured to convey a notification message that may automatically disappear after a short stay without requiring user interaction. For example, the notification manager is configured to provide a notification of download completion, a message reminder, and the like. The notification manager may alternatively be a notification that appears in the status bar at the top of the system in a form of a graph or scroll bar text, for example, a notification of an application running in the background, or a notification that appears on the screen in a form of a dialog window. For example, text information is prompted in the status bar, an alert sound is made, the electronic device vibrates, or an indicator light blinks.

As shown in FIG. 5, to implement the audio processing method provided in this embodiment of this application, the application framework layer may further include an anti-sound-leakage module and the like.

The anti-sound-leakage module may be configured to obtain sound energy of a sound listening region and sound energy of a sound leakage region, and be able to obtain, based on the sound energy of the sound listening region and the sound energy of the sound leakage region, an optimization coefficient corresponding to at least two sound producing devices, where the optimization coefficient may be a maximum value of a sound energy contrast between the sound energy of the sound listening region and the sound energy of the sound leakage region.

After the anti-sound-leakage module obtains the optimization coefficient, the anti-sound-leakage module may send the optimization coefficient to playback filters respectively corresponding to the at least two sound producing devices, so that the playback filters respectively corresponding to the at least two sound producing devices may respectively filter input signals of the at least two sound producing devices, and the at least two sound producing devices may output the filtered input information.

The Android runtime Android runtime includes a kernel library and a virtual machine. The Android runtime Android runtime is responsible for scheduling and managing the Android system.

The kernel library includes two parts: One part is a functional function that needs to be invoked by a java language, and the other part is a kernel library of Android®.

The application layer and the application framework layer run on the virtual machine. The virtual machine executes java files at the application layer and the application framework layer as binary files. The virtual machine is configured to perform functions such as lifecycle management of an object, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a two-dimensional graphics engine (for example, SGL).

The surface manager is configured to manage a display subsystem, and provide fusion of two-dimensional and three-dimensional layers for a plurality of applications.

The media library supports playback and recording in a plurality of common audio and video formats, a still image file, and the like. The media library may support a plurality of audio and video coding formats.

The three-dimensional graphics processing library is configured to implement three-dimensional graphics drawing, image rendering, composition, layer processing, and the like.

The two-dimensional graphics engine is a drawing engine for two-dimensional drawings.

The kernel layer is a layer between hardware and software. The kernel layer includes at least a display driver, a camera driver, an audio driver, and a sensor driver.

A method in the following embodiments may be implemented in an electronic device having the foregoing hardware structure or software structure.

Figure 6:
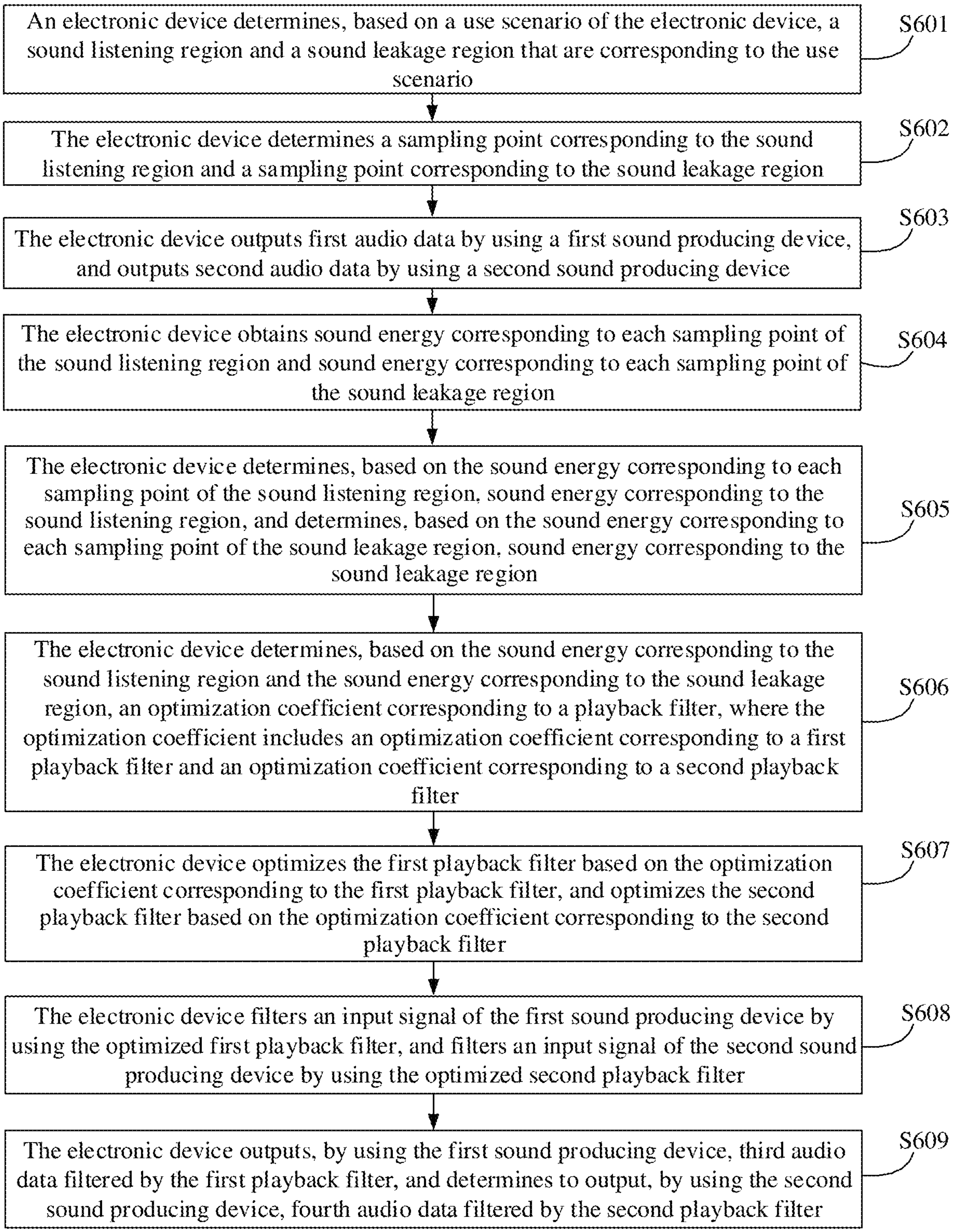
FIG. 6 is a schematic flowchart 1 of an audio processing method according to an embodiment of this application.

With reference to FIG. 6, the following describes in detail the audio processing method provided in an embodiment of this application. FIG. 6 is a schematic flowchart of an audio processing method according to an embodiment of this application. As shown in FIG. 6, the audio processing method may include S601-S609.

S601: An electronic device determines, based on a use scenario of the electronic device, a sound listening region and a sound leakage region that are corresponding to the use scenario.

The electronic device in this embodiment of this application may include a plurality of sound producing devices. The electronic device may achieve an effect of sound field playback by using the plurality of sound producing devices. In this embodiment of this application, an example in which the electronic device includes two sound producing devices is used for description. To be specific, the electronic device may achieve the effect of sound field playback by using the two sound producing devices.

The sound producing device included in the electronic device may be an earpiece included in the electronic device, a speaker included in the electronic device, a receiver included in the electronic device, or the like. For example, when the electronic device achieves the effect of sound field playback by using the two sound producing devices, the two sound producing devices may be two speakers included in the electronic device, and the two sound producing devices may alternatively be an earpiece and a speaker that are included in the electronic device. In this embodiment of this application, an example in which the two sound producing devices included in the electronic device are the earpiece included in the electronic device and the speaker included in the electronic device is used for description. To be specific, the electronic device may achieve an effect of sound field playback by using the two sound producing devices (the earpiece and the speaker).

In some examples, when the two sound producing devices included in the electronic device are the earpiece included in the electronic device and the speaker included in the electronic device, the speaker included in the electronic device may be located in a lower part of a screen of the electronic device, that is, the speaker may be provided with a piezoelectric vibrator in the lower part of the screen, and vibration may enable the screen to vibrate and produce a sound. To be specific, the speaker may produce audio (namely, a sound) by using the screen of the electronic device. When the speaker produces audio by using the screen of the electronic device, the speaker may also be referred to as a screen sound producing apparatus. The speaker included in the electronic device may alternatively be located at another position of the electronic device, for example, in a lower part of the electronic device. A specific position of the speaker is not limited in this embodiment of this application. In this embodiment of this application, an example in which the two sound producing devices included in the electronic device are the earpiece included in the electronic device and the screen sound producing apparatus included in the electronic device is used for description.

During implementation of the audio processing method provided in this embodiment of this application, the electronic device may first determine a use scenario of the electronic device. Then, a sound listening region and a sound leakage region that are corresponding to the use scenario of the electronic device are determined based on the use scenario. Therefore, sound energy corresponding to the sound listening region and sound energy corresponding to the sound leakage region can be determined based on the sound listening region and the sound leakage region that are corresponding to the use scenario. Further, an optimization coefficient of playback filters corresponding to at least two sound producing devices may be determined based on the sound energy corresponding to the sound listening region and the sound energy corresponding to the sound leakage region.

The use scenario of the electronic device may be a use scenario in which the electronic device outputs first audio data and second audio data. The electronic device determines, based on the use scenario of the electronic device, the sound listening region and the sound leakage region that are corresponding to the use scenario, that is, determines a corresponding sound listening region and a corresponding sound leakage region when the electronic device outputs the first audio data and the second audio data. The use scenario of the electronic device may be a scenario in which the electronic device achieves an effect of sound field playback by using two sound producing devices (such as the earpiece and the screen sound producing apparatus). For example, the use scenario of the electronic device may include a scenario in which the user uses the electronic device to perform voice communication (such as a voice call). In the scenario in which the user uses the electronic device to make a voice call, the electronic device achieves the effect of sound field playback by using the two sound producing devices (such as the earpiece and the screen sound producing apparatus). The use scenario of the electronic device may further include a scenario in which the user uses the electronic device to play audio. In the scenario in which the user uses the electronic device to play audio, the electronic device achieves the effect of sound field playback by using the two sound producing devices (such as the earpiece and the screen sound producing apparatus).

A specific use scenario of the electronic device is not limited in this embodiment of this application, provided that the use scenario is a scenario in which the electronic device achieves the effect of sound field playback by using two sound producing devices (such as the earpiece and the screen sound producing apparatus). In this embodiment of this application, an example in which the use scenario of the electronic device may include a scenario in which the user uses the electronic device to perform voice communication (such as a voice call) is used for description.

In some examples, the use scenario of the electronic device may further include a use parameter of the electronic device and a parameter of a sound producing device included in the electronic device. The use parameter of the electronic device may include a position, an angle, and the like of the electronic device when the user of the electronic device uses the electronic device to make a voice call. A specific type of the use parameter of the electronic device is not limited in this embodiment of this application. The parameter of the sound producing device included in the electronic device may include a disposing position of the sound producing device, a distance between sound producing devices, and the like. A specific type of the parameter of the sound producing device included in the electronic device is not limited in this embodiment of this application.

After the electronic device determines the use scenario of the electronic device, the electronic device determines, based on the use scenario of the electronic device, a sound listening region and a sound leakage region that are corresponding to the use scenario.

The sound listening region is a region in which the user expects to hear audio when the electronic device outputs the audio by using the two sound producing devices. For example, the sound listening region may be a region on one side of the screen of the electronic device when the user uses the electronic device to make a voice call. The sound leakage region is a region in which the user does not expect to hear audio when the electronic device outputs the audio by using the two sound producing devices. For example, the sound leakage region may be a region on the other side of the screen of the electronic device when the user uses the electronic device to make a voice call.

In some examples, when the user uses the electronic device to make a voice call, the sound listening region may be all regions in which audio can be heard on one side of the screen of the electronic device, and the sound leakage region may be all regions in which audio can be heard on the other side of the screen of the electronic device.

When the user uses the electronic device to make a voice call, the sound listening region may alternatively be a region that is on one side of the screen of the electronic device and that is on a same plane as the ear of the user, and the sound leakage region may be a region that is on the other side of the screen of the electronic device and that is on the same plane as the ear of the user. In this embodiment of this application, description is provided by using an example in which when the use scenario of the electronic device may include the scenario in which the user uses the electronic device to perform voice communication (such as a voice call), the sound listening region is the region that is on one side of the screen of the electronic device and that is on the same plane as the ear of the user, and the sound leakage region is the region that is on the other side of the screen of the electronic device and that is on the same plane as the ear of the user.

Figure 7:
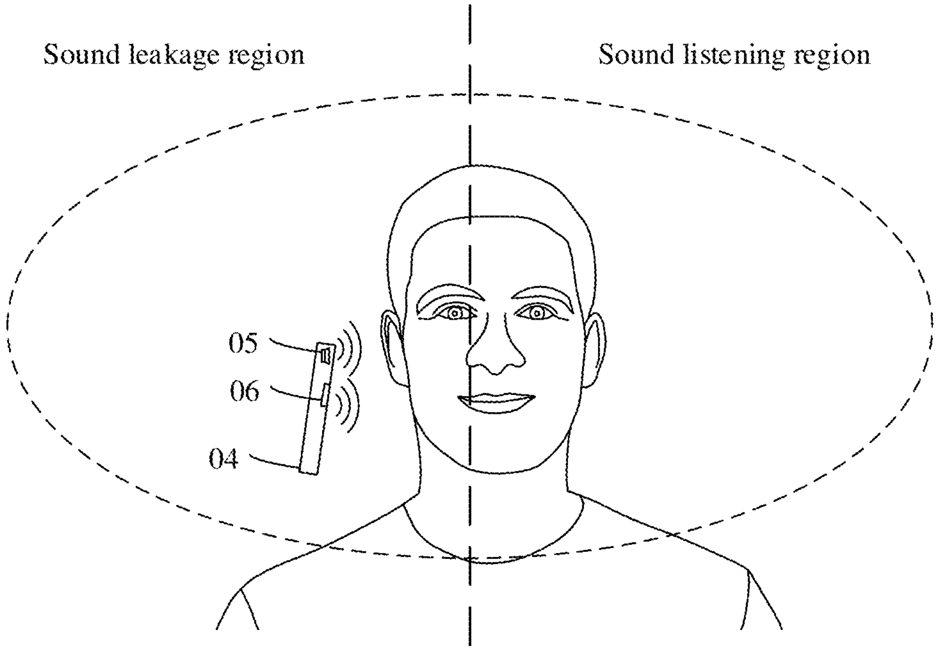
FIG. 7 is a schematic diagram of division of a sound listening region and a sound leakage region according to an embodiment of this application.

For example, as shown in FIG. 7, the mobile phone 04 includes two sound producing devices, namely, the earpiece 06 and the screen sound producing apparatus 05, the earpiece 06 may be located on the upper edge of the screen of the mobile phone 04, and the screen sound producing apparatus 05 may be located in the lower part of the screen of the mobile phone 04, and be close to the position of the earpiece 06. When the use scenario of the mobile phone 04 is the voice call scenario, that is, when the user makes a call by using the mobile phone 04, the earpiece 06 and the screen sound producing apparatus 05 may simultaneously output a sound signal, so that an effect of sound field playback can be achieved. When the user makes a call by using the mobile phone 04, a corresponding sound listening region may be a region that is on one side of the screen of the mobile phone 04 and that is on a same plane as the ear of the user, and the sound leakage region may be a region that is on the other side of the screen of the mobile phone 04 and that is on the same plane as the ear of the user.

In some examples, the electronic device may store a correspondence between the use scenario of the electronic device and the sound listening region and the sound leakage region that are corresponding to the use scenario. After the electronic device determines the use scenario of the electronic device, the electronic device may determine, based on the use scenario of the electronic device, and the correspondence between the use scenario of the electronic device and the sound listening region and the sound leakage region that are corresponding to the use scenario, the sound listening region and the sound leakage region that are corresponding to the use scenario.

S602: The electronic device determines a sound listening region sampling point and a sound leakage region sampling point.

After the electronic device determines, based on the use scenario of the electronic device, the sound listening region and the sound leakage region that are corresponding to the use scenario (namely, the sound listening region and the sound leakage region that are corresponding to the use scenario in which the electronic device outputs the first audio data), the electronic device may determine the sound listening region sampling point and the sound leakage region sampling point. There may be a plurality of sound listening region sampling points, and there may be a plurality of sound leakage region sampling points. A specific quantity of the sound listening region sampling points and a specific quantity of the sound leakage region sampling points are not limited in this embodiment of this application.

The sound listening region sampling point may be used to sample audio of the sound listening region, so that sound energy of the sound listening region can be determined. The sound leakage region sampling point may be used to sample audio of the sound leakage region, so that sound energy of the sound leakage region can be determined.

In some examples, after the electronic device determines, based on the use scenario of the electronic device, the sound listening region and the sound leakage region that are corresponding to the use scenario, the electronic device may evenly dispose sound listening region sampling points in the sound listening region, that is, distances between adjacent sound listening region sampling points are the same, and the distances between adjacent sound listening region sampling points may meet a preset condition. The electronic device may evenly dispose sound leakage region sampling points in the sound leakage region, that is, distances between adjacent sound leakage region sampling points are the same, and the distances between adjacent sound leakage region sampling points may meet a preset condition. The preset condition may include that audio in the sound leakage region can be collected at both of adjacent sampling points.

Figure 8:
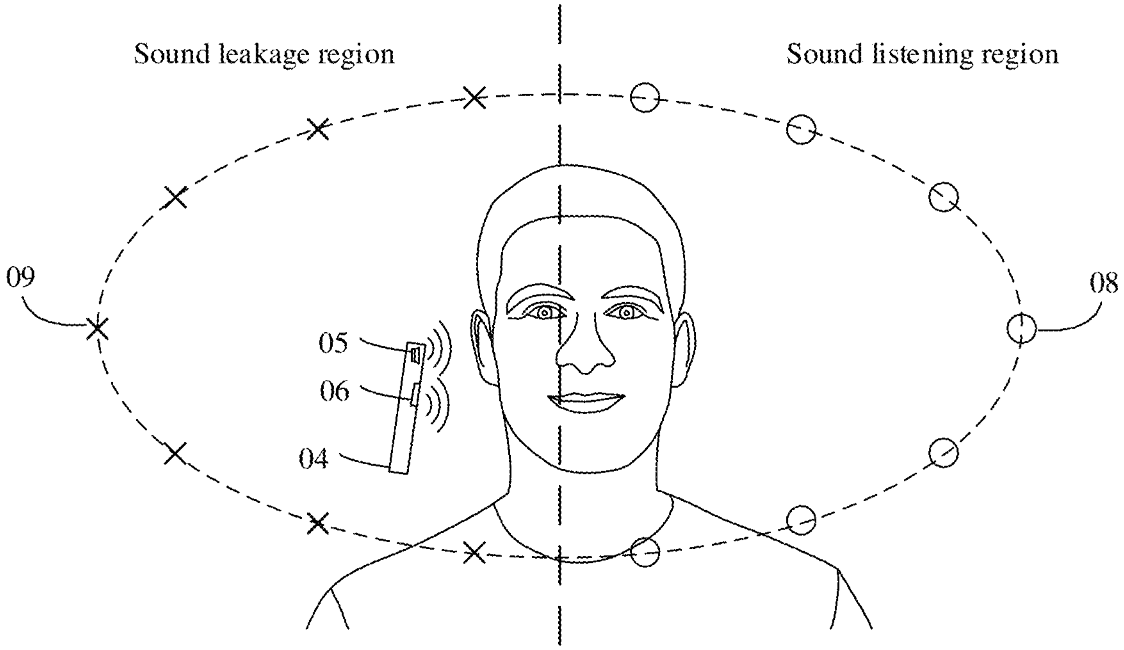
FIG. 8 is a schematic diagram 1 of division of a sound listening region sampling point and a sound leakage region sampling point according to an embodiment of this application.

For example, as shown in FIG. 7, again, the mobile phone 04 includes two sound producing devices (the earpiece 06 and the screen sound producing apparatus 05), the earpiece 06 may be located on the upper edge of the screen of the mobile phone 04, and the screen sound producing apparatus 05 may be located in the lower part of the screen of the mobile phone 04, and be close to the position of the earpiece 06. When the user makes a call by using the mobile phone 04, a corresponding sound listening region may be a region that is on one side of the screen of the mobile phone 04 and that is on a same plane as the ear of the user, and the sound leakage region may be a region that is on the other side of the screen of the mobile phone 04 and that is on the same plane as the ear of the user. Then, as shown in FIG. 8, sound listening region sampling points 08 may be evenly disposed in the sound listening region, and distances between adjacent sound listening region sampling points 08 are the same. Sound leakage region sampling points 09 are evenly disposed in the sound leakage region, and distances between adjacent sound leakage region sampling points 09 are the same.

After the electronic device determines the sound listening region sampling point and the sound leakage region sampling point, an audio collection device may be separately disposed at the sound listening region sampling point and the sound leakage region sampling point, so that the audio of the sound listening region can be sampled at the sound listening region sampling point, and the audio of the sound leakage region can be sampled at the sound leakage region sampling point.

In some examples, a plurality of audio collection devices may be disposed at each sampling point (namely, the sound listening region sampling point and the sound leakage region sampling point), and a quantity of audio collection devices at each sampling point may be the same as data of sound producing devices of the electronic device. For example, when the electronic device includes two sound producing devices, there may be two audio collection devices at each sampling point, which are configured to respectively sample audio of the sound producing devices.

S603: The electronic device outputs first audio data by using a first sound producing device, and outputs second audio data by using a second sound producing device.

After the electronic device determines the sound listening region sampling point and the sound leakage region sampling point, the electronic device may output the first audio data and the second audio data. To be specific, the electronic device may output the first audio data by using the first sound producing device, and output the second audio data by using the second sound producing device, so that the audio of the sound listening region can be sampled at the sound listening region sampling point, and the audio of the sound leakage region can be sampled at the sound leakage region sampling point, that is, the first audio data and the second audio data may be test audio data.

When the electronic device includes two sound producing devices, and the two sound producing devices are an earpiece included in the electronic device and a screen sound producing apparatus included in the electronic device, the first sound producing device may be the earpiece included in the electronic device, and the second sound producing device may be the screen sound producing apparatus included in the electronic device.

The first audio data output by the first sound producing device and the second audio data output by the second sound producing device may be the same or different. For example, frequencies of the first audio data and the second audio data may be the same or different. This is not limited in this embodiment of this application. In this embodiment of this application, an example in which the first audio data and the second audio data are the same audio is used for description.

S604: The electronic device obtains sound energy corresponding to the sound listening region sampling point and sound energy corresponding to the sound leakage region sampling point.

After the electronic device outputs the first audio data by using the first sound producing device and outputs the second audio data by using the second sound producing device, the electronic device may obtain the sound energy corresponding to the sound listening region sampling point and the sound energy corresponding to the sound leakage region sampling point.

The sound energy corresponding to the sound listening region sampling point may include sound energy corresponding to the first audio data at the sound listening region sampling point and sound energy corresponding to the second audio data at the sound listening region sampling point. The sound energy corresponding to the sound leakage region sampling point may include sound energy corresponding to the first audio data at the sound leakage region sampling point and sound energy corresponding to the second audio data at the sound leakage region sampling point.

Sound energy means that sound waves (namely, for example, the first audio data and the second audio data) are propagated in a medium to cause, on one hand, a medium particle to reciprocate near an equilibrium position to generate kinetic energy, and to cause, on the other hand, the medium to produce a density process of compression and expansion, and cause the medium to have potential energy of deformation. A sum of these two parts of energy is sound energy obtained by the medium through acoustic vibration. A magnitude of the sound energy may reflect a magnitude of the sound. To be specific, when sound energy corresponding to a specific sampling point is large, a sound that can be heard at the sampling point is large; when sound energy corresponding to a specific sampling point is small, a sound that can be heard at the sampling point is small.

The sound energy corresponding to the sound listening region sampling point may include sound energy corresponding to the first audio data and sound energy corresponding to the second audio data at each sound listening region sampling point. The sound energy corresponding to the sound leakage region sampling point may include sound energy corresponding to the first audio data and sound energy corresponding to the second audio data at each sound leakage region sampling point.

In some examples, the sound energy may be represented by a transfer function (which may also be referred to as a pulse response, that is, a time response caused by applying a pulse function on an input). The transfer function is a concept of an engineering control theory. The transfer function reflects a function relationship between system output and input, and is a frequency domain analysis method. The transfer function is obtained based on a ratio of Laplace transform of an output function (with respect to time) to Laplace transform of an input function (with respect to time).

In some examples, that the electronic device obtains the sound energy corresponding to the sound listening region sampling point and the sound energy corresponding to the sound leakage region sampling point may include: collecting, by using the audio collection device at each sound listening region sampling point, the sound energy corresponding to the first audio data and the sound energy corresponding to the second audio data, so that the electronic device can obtain a transfer function corresponding to the first audio data and a transfer function corresponding to the second audio data at each sound listening region sampling point; and collecting, by using the audio collection device at each sound leakage region sampling point, the sound energy corresponding to the first audio data and the sound energy corresponding to the second audio data, so that the electronic device can obtain a transfer function corresponding to the first audio data and a transfer function corresponding to the second audio data at each sound leakage region sampling point.

S605: The electronic device determines, based on the sound energy corresponding to the sound listening region sampling point, sound energy corresponding to the sound listening region, and determines, based on the sound energy corresponding to the sound leakage region sampling point, sound energy corresponding to the sound leakage region.

After the electronic device obtains the sound energy corresponding to the sound listening region sampling point and the sound energy corresponding to the sound leakage region sampling point, the electronic device may determine, based on the sound energy corresponding to the sound listening region sampling point, the sound energy corresponding to the sound listening region. The sound energy corresponding to the sound listening region may include first sound energy corresponding to the first audio data in the sound listening region and third sound energy corresponding to the second audio data in the sound listening region. In addition, the electronic device may determine, based on the sound energy corresponding to the sound leakage region sampling point, the sound energy corresponding to the sound leakage region. The sound energy corresponding to the sound leakage region may include second sound energy corresponding to the first audio data in the sound leakage region and fourth sound energy corresponding to the second audio data in the sound leakage region.

In other words, the sound energy corresponding to the sound listening region may include the sound energy of the sound listening region corresponding to the first sound producing device, and the sound energy of the sound listening region corresponding to the second sound producing device. The sound energy corresponding to the sound leakage region may include the sound energy of the sound leakage region corresponding to the first sound producing device, and the sound energy of the sound leakage region corresponding to the second sound producing device.

When there are a plurality of sound listening region sampling points, that the electronic device determines, based on the sound energy corresponding to the sound listening region sampling point, the sound energy corresponding to the sound listening region may include: The electronic device determines, based on sound energy corresponding to the first audio data at the plurality of sound listening region sampling points, the sound energy of the sound listening region corresponding to the first sound producing device; the electronic device determines, based on sound energy corresponding to the second audio data at the plurality of sound listening region sampling points, the sound energy of the sound listening region corresponding to the second sound producing device; the electronic device determines, based on sound energy corresponding to the first audio data at each sound leakage region sampling point, the sound energy of the sound leakage region corresponding to the first sound producing device; and the electronic device determines, based on sound energy corresponding to the second audio data at each sound leakage region sampling point, the sound energy of the sound leakage region corresponding to the second sound producing device.

In some examples, when the sound energy is represented by using a transfer function, that the electronic device determines, based on the sound energy corresponding to the sound listening region sampling point, the sound energy corresponding to the sound listening region may include: The electronic device determines, based on a transfer function corresponding to the first audio data at the plurality of sound listening region sampling points, a transfer function of the sound listening region corresponding to the first sound producing device (which may also be referred to as a first transfer function in this embodiment of this application); the electronic device determines, based on a transfer function corresponding to the second audio data at the plurality of sound listening region sampling points, a transfer function of the sound listening region corresponding to the second sound producing device (which may also be referred to as a third transfer function in this embodiment of this application); the electronic device determines, based on a transfer function corresponding to the first audio data at each sound leakage region sampling point, a transfer function of the sound leakage region corresponding to the first sound producing device (which may also be referred to as a second transfer function in this embodiment of this application); and the electronic device determines, based on a transfer function corresponding to the second audio data at each sound leakage region sampling point, a transfer function of the sound leakage region corresponding to the second sound producing device (which may also be referred to as a fourth transfer function in this embodiment of this application).

In some examples, when the electronic device determines, based on the sound energy corresponding to the sound listening region sampling point, the sound energy corresponding to the sound listening region, the electronic device may determine, based on a weight of each sound listening region sampling point, the sound energy corresponding to the sound listening region. Different sound listening region sampling points may correspond to different weights. A sound listening region sampling point in a region in which the user most expects to hear audio in the sound listening region may correspond to a high weight. A sound listening region sampling point in a region in which the user does not expect to hear audio in the sound listening region may correspond to a low weight.

The electronic device may determine, based on the sound energy corresponding to the sound leakage region sampling point and based on the weight of each sound leakage region sampling point, the sound energy corresponding to the sound leakage region. Different sound listening region sampling points may correspond to different weights. A sound leakage region sampling point in a region in which the user most does not expect to hear audio in the sound leakage region may correspond to a high weight. A sound leakage region sampling point in another region in the sound leakage region may correspond to a low weight.

Figure 9:
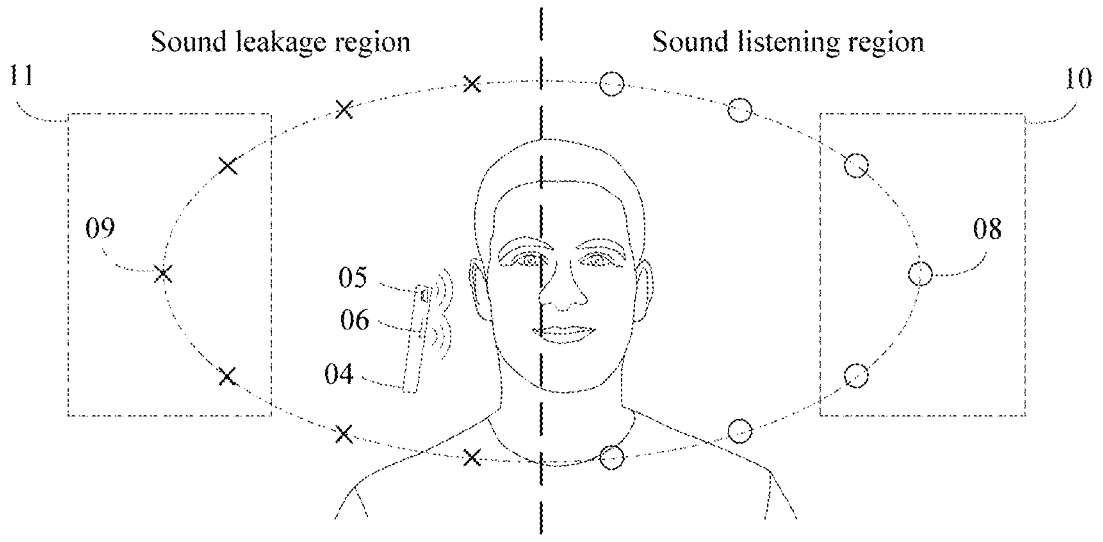
FIG. 9 is a schematic diagram 2 of division of a sound listening region sampling point and a sound leakage region sampling point according to an embodiment of this application.

For example, as shown in FIG. 8, the mobile phone 04 includes two sound producing devices (the earpiece 06 and the screen sound producing apparatus 05), the earpiece 06 is located on the upper edge of the screen of the mobile phone 04, and the screen sound producing apparatus 05 may be located in the lower part of the screen of the mobile phone 04, and be close to the position of the earpiece 06. When the user makes a call by using the mobile phone 04, a corresponding sound listening region is a region that is on one side of the screen of the mobile phone 04 and that is on a same plane as the ear of the user, and the sound leakage region is a region that is on the other side of the screen of the mobile phone 04 and that is on the same plane as the ear of the user. Then, sound listening region sampling points 08 are evenly disposed in the sound listening region, and distances between adjacent sound listening region sampling points 08 are the same. Sound leakage region sampling points 09 are evenly disposed in the sound leakage region, and distances between adjacent sound leakage region sampling points 09 are the same. After the sound listening region sampling points 08 and the sound leakage region sampling points 09 are determined, different weights are set for different sound listening region sampling points 08. As shown in FIG. 9, high weights may be set for the plurality of sound listening region sampling points 08 in a region 10 in the sound listening region. Different weights are set for different sound leakage region sampling points 09. As shown in FIG. 9, high weights may be set for the plurality of sound leakage region sampling points 09 in a region 11 in the sound leakage region.

After the sound energy corresponding to each sound listening region sampling point 08 is obtained, the sound energy corresponding to the sound listening region may be determined based on a weight corresponding to each sound listening region sampling point 08. After the sound energy corresponding to each sound leakage region sampling point 09 is obtained, the sound energy corresponding to the sound leakage region may be determined based on a weight corresponding to each sound leakage region sampling point 09.

S606: The electronic device determines, based on the sound energy corresponding to the sound listening region and the sound energy corresponding to the sound leakage region, an optimization coefficient corresponding to a playback filter, where the optimization coefficient includes an optimization coefficient corresponding to a first playback filter and an optimization coefficient corresponding to a second playback filter.

After the electronic device determines, based on the sound energy corresponding to the sound listening region sampling point, the sound energy corresponding to the sound listening region, and determines, based on the sound energy corresponding to the sound leakage region sampling point, the sound energy corresponding to the sound leakage region, the electronic device may determine, based on the sound energy corresponding to the sound listening region and the sound energy corresponding to the sound leakage region, the optimization coefficient corresponding to the playback filter (which may also be referred to as an audio optimization coefficient in this embodiment of this application). The audio optimization coefficient may include the optimization coefficient corresponding to the first playback filter and the optimization coefficient corresponding to the second playback filter, or may be referred to as an objective function.

The playback filter may be configured to filter an input signal (namely, audio data) of a sound producing device, so that the sound producing device can output filtered input information (namely, audio data). A quantity of playback filters is in a one-to-one correspondence with a quantity of sound producing devices. To be specific, when the electronic device includes a first sound producing device and a second sound producing device, the electronic device includes a first playback filter and a second playback filter. The first playback filter corresponds to the first sound producing device, that is, the first playback filter filters an input signal (namely, audio data) of the first sound producing device, so that the first sound producing device can output filtered input information (namely, audio data). The second playback filter corresponds to the second sound producing device, that is, the second playback filter filters an input signal (namely, audio data) of the second sound producing device, so that the second sound producing device can output filtered input information (namely, audio data).

In some examples, that the electronic device determines, based on the sound energy corresponding to the sound listening region and the sound energy corresponding to the sound leakage region, an optimization coefficient corresponding to a playback filter may include: The electronic device determines, based on the sound energy of the sound listening region corresponding to the first sound producing device and the sound energy of the sound leakage region corresponding to the first sound producing device, the optimization coefficient corresponding to the first playback filter.

The optimization coefficient corresponding to the first playback filter may be a sound energy contrast corresponding to the first sound producing device. The sound energy contrast may be a ratio of the sound energy of the sound listening region to the sound energy of the sound leakage region. To be specific, the sound energy contrast of the first sound producing device may be a ratio of the sound energy of the sound listening region corresponding to the first sound producing device to the sound energy of the sound leakage region corresponding to the first sound producing device. To minimize the sound energy of the first sound producing device in the sound leakage region, the sound energy contrast of the first sound producing device may be maximized. When the sound energy contrast of the first sound producing device is maximized, the sound energy of the sound leakage region corresponding to the first sound producing device is minimized.

In some examples, when the sound energy is represented by using a transfer function, that the electronic device determines, based on the sound energy of the sound listening region corresponding to the first sound producing device and the sound energy of the sound leakage region corresponding to the first sound producing device, the optimization coefficient corresponding to the first playback filter may include: The electronic device determines, based on a transfer function corresponding to the first audio data at the plurality of sound listening region sampling points, a transfer function of the sound listening region corresponding to the first sound producing device. The electronic device determines, based on a transfer function corresponding to the first audio data at each sound leakage region sampling point, a transfer function of the sound leakage region corresponding to the first sound producing device. Then, the electronic device may determine, based on a ratio of the transfer function of the sound listening region corresponding to the first sound producing device to the transfer function of the sound leakage region corresponding to the first sound producing device, the optimization coefficient corresponding to the first playback filter. In other words, when the ratio of the transfer function of the sound listening region corresponding to the first sound producing device to the transfer function of the sound leakage region corresponding to the first sound producing device is maximized, the maximized ratio is the optimization coefficient corresponding to the first playback filter (in this case, the first optimization coefficient may also be referred to as a first objective function).

In some examples, that the electronic device determines, based on the sound energy corresponding to the sound leakage region and the sound energy corresponding to the sound leakage region, an optimization coefficient corresponding to a playback filter may include: The electronic device determines, based on the sound energy of the sound leakage region corresponding to the second sound producing device and the sound energy of the sound leakage region corresponding to the second sound producing device, the optimization coefficient corresponding to the second playback filter.

The optimization coefficient corresponding to the second playback filter may be a sound energy contrast corresponding to the second sound producing device. The sound energy contrast may be a ratio of the sound energy of the sound listening region to the sound energy of the sound leakage region. To be specific, the sound energy contrast of the second sound producing device may be a ratio of the sound energy of the sound listening region corresponding to the second sound producing device to the sound energy of the sound leakage region corresponding to the second sound producing device. To minimize the sound energy of the second sound producing device in the sound leakage region, the sound energy contrast of the second sound producing device may be maximized. When the sound energy contrast of the second sound producing device is maximized, the sound energy of the sound leakage region corresponding to the second sound producing device is minimized.

In some examples, when the sound energy is represented by using a transfer function, that the electronic device determines, based on the sound energy of the sound listening region corresponding to the second sound producing device and the sound energy of the sound leakage region corresponding to the second sound producing device, the optimization coefficient corresponding to the second playback filter may include: The electronic device determines, based on a transfer function corresponding to the second audio data at the plurality of sound listening region sampling points, a transfer function of the sound listening region corresponding to the second sound producing device. The electronic device determines, based on a transfer function corresponding to the second audio data at each sound leakage region sampling point, a transfer function of the sound leakage region corresponding to the second sound producing device. Then, the electronic device may determine, based on a ratio of the transfer function of the sound listening region corresponding to the second sound producing device to the transfer function of the sound leakage region corresponding to the second sound producing device, the optimization coefficient corresponding to the second playback filter. In other words, when the ratio of the transfer function of the sound listening region corresponding to the second sound producing device to the transfer function of the sound leakage region corresponding to the second sound producing device is maximized, the maximized ratio is the optimization coefficient corresponding to the second playback filter (in this case, the second optimization coefficient may also be referred to as a second objective function).

S607: The electronic device optimizes the first playback filter based on the optimization coefficient corresponding to the first playback filter, and optimizes the second playback filter based on the optimization coefficient corresponding to the second playback filter.

After the electronic device determines, based on the sound energy corresponding to the sound listening region and the sound energy corresponding to the sound leakage region, the optimization coefficient (namely, an audio optimization coefficient) corresponding to the playback filter, where the optimization coefficient includes an optimization coefficient corresponding to the first playback filter and an optimization coefficient corresponding to the second playback filter, the electronic device may optimize the first playback filter based on the optimization coefficient corresponding to the first playback filter, and optimize the second playback filter based on the optimization coefficient corresponding to the second playback filter. In other words, the audio optimization coefficient may be used to reduce sound energy corresponding to third audio data that corresponds to the first sound producing device in the sound leakage region and sound energy corresponding to fourth audio data that corresponds to the second sound producing device in the sound leakage region.

In some examples, that the electronic device optimizes the first playback filter based on the optimization coefficient corresponding to the first playback filter may include: The first playback filter may be multiplied by the optimization coefficient corresponding to the first playback filter, so that the optimized first playback filter can filter an input signal of the first sound producing device.

That the electronic device optimizes the second playback filter based on the optimization coefficient corresponding to the second playback filter may include: The second playback filter may be multiplied by the optimization coefficient corresponding to the second playback filter, so that the optimized second playback filter can filter an input signal of the second sound producing device.

S608: The electronic device filters the input signal of the first sound producing device by using the optimized first playback filter, and filters the input signal of the second sound producing device by using the optimized second playback filter.

After the electronic device optimizes the first playback filter based on the optimization coefficient corresponding to the first playback filter, and optimizes the second playback filter based on the optimization coefficient corresponding to the second playback filter, the electronic device may filter the input signal of the first sound producing device by using the optimized first playback filter, and filter the input signal of the second sound producing device by using the optimized second playback filter.

The input signal of the first sound producing device may be an audio signal that is input by the electronic device to the first sound producing device when the user performs voice communication by using the electronic device. The input signal of the second sound producing device may be an audio signal that is input by the electronic device to the second sound producing device when the user performs voice communication by using the electronic device.

In some examples, before the electronic device filters the input signal of the first sound producing device by using the optimized first playback filter and filters the input signal of the second sound producing device by using the optimized second playback filter, the electronic device may determine whether a use scenario in which the electronic device outputs the optimized input signal is the same as a use scenario in which the electronic device outputs the first audio data and the second audio data. In a case in which the use scenario in which the electronic device outputs the optimized input signal is the same as the use scenario in which the electronic device outputs the first audio data and the second audio data, the input signal of the first sound producing device may be filtered by using the optimized first playback filter, and the input signal of the second sound producing device may be filtered by using the optimized second playback filter.

In a case in which the use scenario in which the electronic device outputs the optimized input signal is different from the use scenario in which the electronic device outputs the first audio data and the second audio data, the electronic device may first obtain an audio optimization coefficient corresponding to the use scenario in which the optimized input signal is output, so that the filter is filtered by using the audio optimization coefficient corresponding to the use scenario in which the optimized input signal is output, and the input signal is filtered by using the optimized filter to obtain the optimized input signal.

S609: The electronic device outputs, by using the first sound producing device, the third audio data filtered by the first playback filter, and determines to output, by using the second sound producing device, the fourth audio data filtered by the second playback filter.

After the electronic device filters the input signal of the first sound producing device by using the optimized first playback filter, and filters the input signal of the second sound producing device by using the optimized second playback filter, the electronic device outputs, by using the first sound producing device, the third audio data filtered by the first playback filter, and determines to output, by using the second sound producing device, the fourth audio data filtered by the second playback filter.

The third audio data may be audio data output by the first sound producing device when the user performs voice communication by using the electronic device. The fourth audio data may be audio data output by the second sound producing device when the user performs voice communication by using the electronic device.

After the electronic device outputs, by using the first sound producing device, the third audio data filtered by the first playback filter, and determines to output, by using the second sound producing device, the fourth audio data filtered by the second playback filter, because the optimization coefficient filtered by the first playback filter is a value corresponding to the maximum sound energy contrast of the first sound producing device, sound energy of the third audio data output by the first sound producing device in the sound leakage region decreases, but sound energy of the third audio data output by the first sound producing device in the sound listening region does not decrease. In addition, because the optimization coefficient filtered by the second playback filter is a value corresponding to the maximum sound energy contrast of the second sound producing device, sound energy of the fourth audio data output by the second sound producing device in the sound leakage region decreases, but sound energy of the fourth audio data output by the second sound producing device in the sound listening region does not decrease.

Therefore, the electronic device outputs, by using the first sound producing device, the third audio data filtered by the first playback filter, and determines to output, by using the second sound producing device, the fourth audio data filtered by the second playback filter. This can reduce the sound energy of the third audio data output by the first sound producing device in the sound leakage region, and reduce the sound energy of the fourth audio data output by the second sound producing device in the sound leakage region. Therefore, sound leakage in the earpiece can be prevented. In addition, after the electronic device outputs, by using the first sound producing device, the third audio data filtered by the first playback filter, and determines to output, by using the second sound producing device, the fourth audio data filtered by the second playback filter, the third audio data output by the first sound producing device and the fourth audio data output by the second sound producing device may implement interference cancellation in the sound leakage region. In addition, the sound energy of the third audio data output by the first sound producing device in the sound leakage region decreases, but the sound energy of the fourth audio data output by the second sound producing device in the sound listening region does not decrease. The third audio data output by the first sound producing device and the fourth audio data output by the second sound producing device still implement sound field playback in the sound listening region, and do not reduce the sound energy of the sound listening region, thereby ensuring auditory perception of the user.

For example, as shown in FIG. 9, again, the mobile phone 04 includes two sound producing devices (the earpiece 06 and the screen sound producing apparatus 05), the earpiece 06 is located on the upper edge of the screen of the mobile phone 04, and the screen sound producing apparatus 05 may be located in the lower part of the screen of the mobile phone 04, and be close to the position of the earpiece 06. When the user makes a call by using the mobile phone 04, a corresponding sound listening region is a region that is on one side of the screen of the mobile phone 04 and that is on a same plane as the ear of the user, and the sound leakage region is a region that is on the other side of the screen of the mobile phone 04 and that is on the same plane as the ear of the user. Then, sound listening region sampling points 08 are evenly disposed in the sound listening region, and distances between adjacent sound listening region sampling points 08 are the same. Sound leakage region sampling points 09 are evenly disposed in the sound leakage region, and distances between adjacent sound leakage region sampling points 09 are the same. After the sound listening region sampling points 08 and the sound leakage region sampling points 09 are determined, different weights are set for different sound listening region sampling points 08. High weights may be set for the plurality of sound listening region sampling points 08 in a region 10 in the sound listening region. Different weights are set for different sound leakage region sampling points 09. High weights may be set for the plurality of sound leakage region sampling points 09 in a region 11 in the sound leakage region. The sound energy corresponding to the earpiece in the sound listening region and the sound energy corresponding to the screen sound producing apparatus 05 in the sound listening region may be determined based on the sound energy of the sound listening region sampling point 08, and the sound energy corresponding to the earpiece in the sound leakage region and the sound energy corresponding to the screen sound producing apparatus 05 in the sound leakage region may be determined based on the sound energy of the sound leakage region sampling point 09. Then, an optimization coefficient corresponding to the playback filter (namely, the first playback filter) that corresponds to the earpiece 04 and an optimization coefficient corresponding to the playback filter (namely, the second playback filter) that corresponds to the screen sound producing apparatus 05 may be determined.

Then, the first playback filter may be optimized based on the optimization coefficient corresponding to the first playback filter, and the second playback filter may be optimized based on the optimization coefficient corresponding to the second playback filter. The input signal of the first sound producing device (namely, the earpiece 04) is filtered by using the optimized first playback filter, and the input signal of the second sound producing device (namely, the screen sound producing apparatus 05) is filtered by using the optimized second playback filter. The third audio data filtered by the first playback filter is output by using the first sound producing device (namely, the earpiece 04), and it is determined that the fourth audio data filtered by the second playback filter is output by using the second sound producing device (namely, the screen sound producing apparatus 05).

Figure 10:
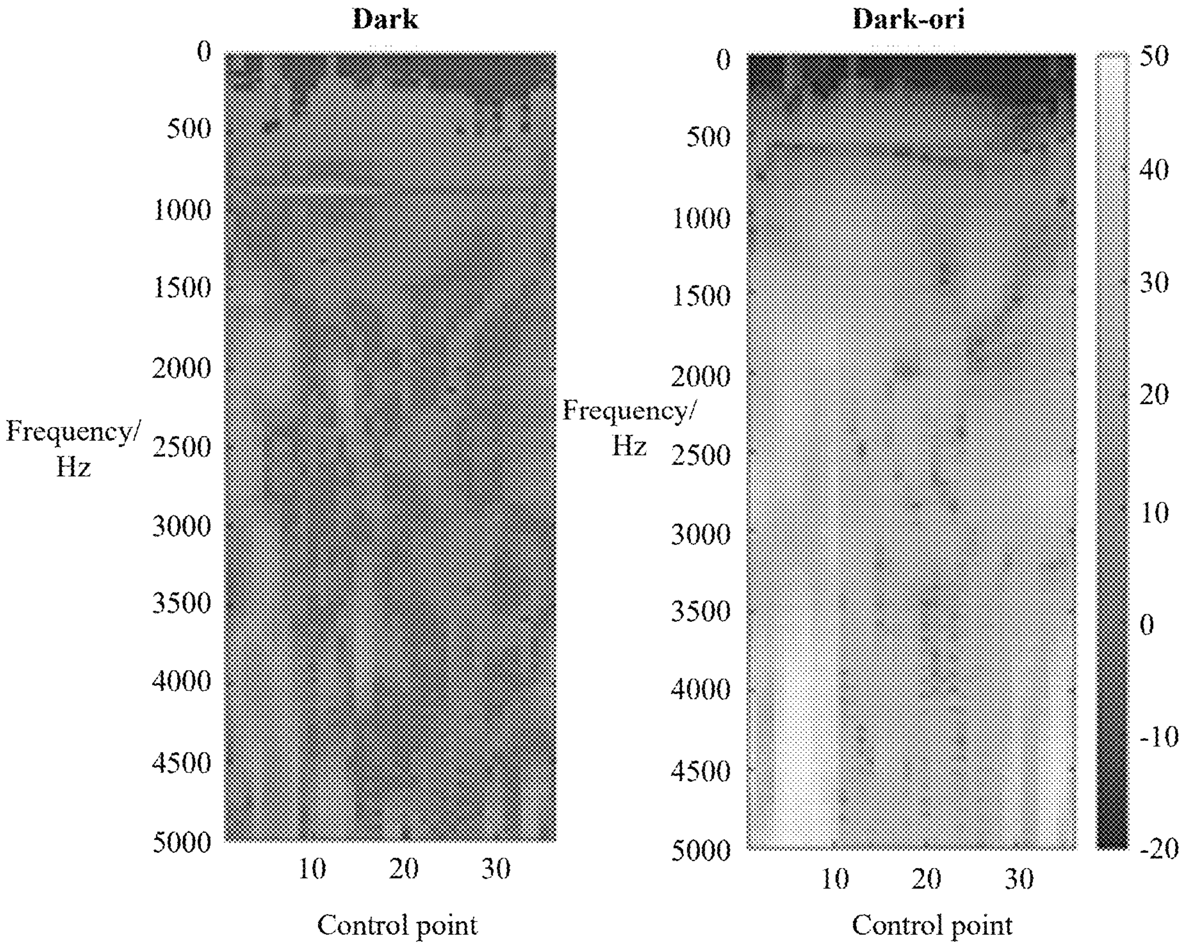
FIG. 10 is a schematic diagram of comparison of sound energy of sound leakage region sampling points according to an embodiment of this application.

After the third audio data filtered by the first playback filter is output by using the first sound producing device (namely, the earpiece 04), and it is determined that the fourth audio data filtered by the second playback filter is output by using the second sound producing device (namely, the screen sound producing apparatus 05), the sound energy of the sound listening region and the received energy of the sound leakage region may be collected. Sound energy corresponding to a sound leakage region sampling point shown in (a) in FIG. 10 is sound energy corresponding to a sound leakage region sampling point before optimization, and sound energy corresponding to a sound leakage region sampling point shown in (b) in FIG. 10 is sound energy corresponding to a sound leakage region sampling point after optimization. It can be learned through comparison that the sound energy corresponding to the sound leakage region sampling point after optimization decreases compared with the sound energy corresponding to the sound leakage region sampling point before optimization.

In some examples, the use scenario in which the electronic device outputs the third audio data and the fourth audio data is the same as the use scenario in which the electronic device outputs the first audio data and the second audio data.

In the solution of this application, because the optimization coefficient of the playback filters corresponding to the at least two sound producing devices is the maximum value of the sound energy contrast between the sound energy of the sound listening region and the sound energy of the sound leakage region, the optimized playback filters can reduce the sound energy of the sound leakage region, and the optimized playback filters can keep the sound energy of the sound listening region unchanged. In addition, after the electronic device outputs, by using the first sound producing device, the third audio data filtered by the first playback filter, and determines to output, by using the second sound producing device, the fourth audio data filtered by the second playback filter, the third audio data output by the first sound producing device and the fourth audio data output by the second sound producing device may implement interference cancellation in the sound leakage region, further reducing the sound energy of the sound leakage region. In other words, in the solution of this application, the sound energy of the sound leakage region can be reduced while sound field playback can be implemented by using the at least two sound producing devices. In other words, the solution of this application can ensure auditory perception of the user while preventing sound leakage.

Figure 11:
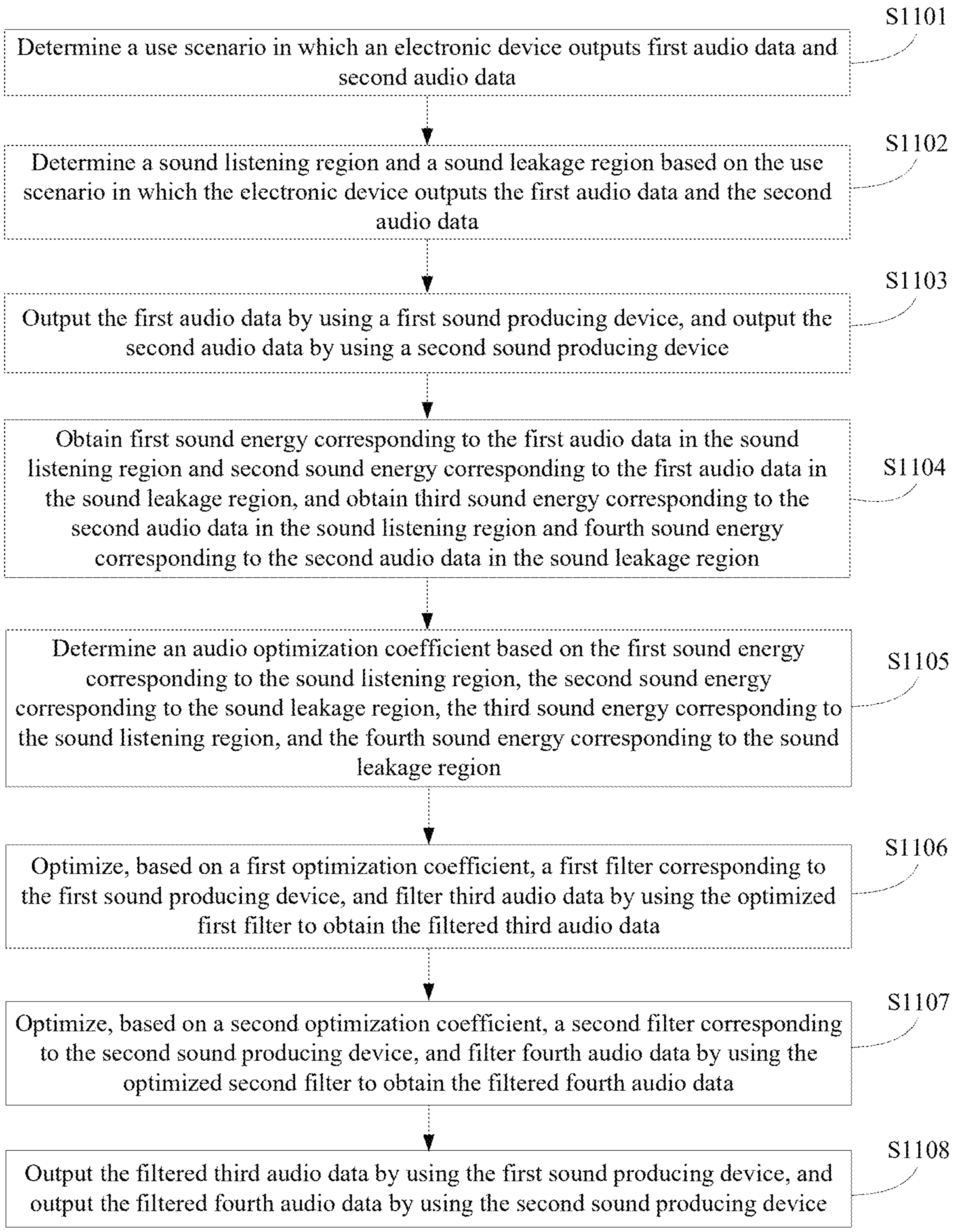
FIG. 11 is a schematic flowchart 2 of an audio processing method according to an embodiment of this application.

For ease of understanding, the following describes the audio processing method provided in the embodiments of this application with reference to FIG. 11. As shown in FIG. 11, the audio processing method may include S1101-S1108.

S1101: Determine a use scenario in which an electronic device outputs first audio data and second audio data.

The electronic device in this embodiment of this application may include at least two sound producing devices. The at least two sound producing devices may include at least one of an earpiece of the electronic device, a speaker of the electronic device, or a screen sound producing apparatus of the electronic device.

In some examples, the electronic device includes at least two sound producing devices, and the electronic device may implement sound field playback by using the two sound producing devices. The at least two sound producing devices included in the electronic device may include a first sound producing device and a second sound producing device. For example, when the electronic device includes two sound producing devices, that is, the electronic device includes the earpiece and the screen sound producing device, and when the user uses the electronic device to make a call, the electronic device may output audio data by using the earpiece and the screen sound producing device, thereby implementing sound field playback.

During implementation of the audio processing method provided in this embodiment of this application, the electronic device may first determine the use scenario in which the electronic device outputs the first audio data and the second audio data, so that the electronic device can determine, based on the use scenario in which the electronic device outputs the first audio data and the second audio data, a corresponding sound listening region and a corresponding sound leakage region when the electronic device outputs the first audio data and the second audio data. The first audio data is audio data output by the electronic device by using the first sound producing device. The second audio data is audio data output by the electronic device by using the second sound producing device.

The use scenario in which the electronic device outputs the first audio data and the second audio data may include a scenario in which the electronic device achieves an effect of sound field playback by using two sound producing devices (such as the earpiece and the screen sound producing device). The use scenario in which the electronic device outputs the first audio data and the second audio data may further include a use parameter of the electronic device and a parameter of a sound producing device included in the electronic device. The use parameter of the electronic device may include a position and an angle of the electronic device, a distance between the electronic device and the user (for example, a distance between the electronic device and the ear of the user when the user uses the electronic device), and the like when the user of the electronic device uses the electronic device to make a voice call. The parameter of the sound producing device included in the electronic device may include a disposing position of the sound producing device, a distance between sound producing devices, and the like, for example, positions of the earpiece and the screen sound producing device that are included in the electronic device, and a distance between the earpiece and the screen sound producing device.

Specifically, for a specific implementation of determining the use scenario in which the electronic device outputs the first audio data and the second audio data in this embodiment of this application, refer to the specific implementation in S601. Details are not described again in this embodiment of this application.

S1102: Determine a sound listening region and a sound leakage region based on the use scenario in which the electronic device outputs the first audio data and the second audio data.

After the use scenario in which the electronic device outputs the first audio data and the second audio data is determined, the sound listening region and the sound leakage region may be determined based on the use scenario in which the electronic device outputs the first audio data and the second audio data, that is, the sound listening region and the sound leakage region that are corresponding to the use scenario of the first audio data and the second audio data.

The first audio data and the second audio data may be audio data, such as test audio data, used when an audio optimization coefficient is determined.

In some examples, after the sound listening region and the sound leakage region that are corresponding to the use scenario of the first audio data and the second audio data are determined, a sampling point corresponding to the sound listening region and a sampling point corresponding to the sound leakage region may be determined. There may be a plurality of sampling points corresponding to the sound listening region, and there may also be a plurality of sampling points corresponding to the sound leakage region. The sampling point corresponding to the sound listening region may be used to sample the audio data of the sound listening region, so that sound energy of the sound listening region can be determined. The sampling point corresponding to the sound leakage region may be used to sample the audio data of the sound leakage region, so that sound energy of the sound leakage region can be determined.

Specifically, for a specific implementation of determining the sound listening region and the sound leakage region based on the use scenario in which the electronic device outputs the first audio data and the second audio data in this embodiment of this application, refer to the specific implementation in S602. Details are not described again in this embodiment of this application.

S1103: Output the first audio data by using a first sound producing device, and output the second audio data by using a second sound producing device.

After the sound listening region and the sound leakage region (namely, the sound listening region and the sound leakage region that are corresponding to the use scenario of the first audio data and the second audio data) are determined, the first audio data may be output by using the first sound producing device, and the second audio data may be output by using the second sound producing device, so that first sound energy corresponding to the first audio data in the sound listening region and third sound energy corresponding to the first audio data in the sound listening region can be obtained at a sampling point corresponding to the sound listening region, and second sound energy corresponding to the first audio data in the sound leakage region and fourth sound energy corresponding to the first audio data in the sound leakage region can be obtained at a sampling point corresponding to the sound leakage region.

It should be noted that when the electronic device includes a plurality of sound producing devices, that the electronic device outputs the first audio data by using the first sound producing device, and outputs the second audio data by using the second sound producing device may be that the electronic device separately outputs the audio data by using each sound producing device.

It should be noted that when the electronic device includes a plurality of sound producing devices, the audio data separately output by the electronic device by using each sound producing device may be the same or different. This is not limited in this embodiment of this application.

Specifically, for a specific implementation of outputting the first audio data by using the first sound producing device and outputting the second audio data by using the second sound producing device in this embodiment of this application, refer to the specific implementation in S603. Details are not described again in this embodiment of this application.

S1104: Obtain first sound energy corresponding to the first audio data in the sound listening region and second sound energy corresponding to the first audio data in the sound leakage region, and obtain third sound energy corresponding to the second audio data in the sound listening region and fourth sound energy corresponding to the second audio data in the sound leakage region. After the first audio data is output by using the first sound producing device and the second audio data is output by using the second sound producing device, the first sound energy corresponding to the first audio data in the sound listening region and the second sound energy corresponding to the first audio data in the sound leakage region may be obtained, and the third sound energy corresponding to the second audio data in the sound listening region and the fourth sound energy corresponding to the second audio data in the sound leakage region may be obtained.

In some examples, the obtaining first sound energy corresponding to the first audio data in the sound listening region and second sound energy corresponding to the first audio data in the sound leakage region may include: obtaining a first transfer function corresponding to the first audio data in the sound listening region and obtaining a second transfer function corresponding to the first audio data in the sound leakage region. Then, the first sound energy corresponding to the first audio data in the sound listening region may be determined based on the first transfer function corresponding to the sound listening region, and the second sound energy corresponding to the first audio data in the sound leakage region may be determined based on the second transfer function corresponding to the sound leakage region.

In some examples, the obtaining a first transfer function corresponding to the first audio data in the sound listening region may include: obtaining a transfer function of the first audio data at each sampling point in the sound listening region. Then, the first transfer function corresponding to the first audio data in the sound listening region may be determined based on the transfer function of the first audio data at each sampling point in the sound listening region.

The obtaining a second transfer function corresponding to the first audio data in the sound leakage region may include: obtaining a transfer function of the first audio data at each sampling point in the sound leakage region. Then, the transfer function corresponding to the first audio data in the sound leakage region may be determined based on the transfer function of the first audio data at each sampling point in the sound leakage region.

In some examples, that the first transfer function corresponding to the first audio data in the sound listening region is determined based on the transfer function of the first audio data at each sampling point in the sound listening region may include: determining a weight corresponding to each sampling point in the sound listening region. Then, the first transfer function corresponding to the first audio data in the sound listening region is determined based on the weight corresponding to each sampling point in the sound listening region and the transfer function of each sampling point in the sound listening region. The first transfer function corresponding to the first audio data in the sound listening region may be accurately determined by using the weight corresponding to each sampling point in the sound listening region, so that the first sound energy corresponding to the sound listening region and the second sound energy corresponding to the sound leakage region can be determined.

It should be noted that the foregoing manner of obtaining the third sound energy corresponding to the second audio data in the sound listening region and the fourth sound energy corresponding to the second audio data in the sound leakage region may be the same as the foregoing manner of obtaining the first sound energy corresponding to the first audio data in the sound listening region and the second sound energy corresponding to the first audio data in the sound leakage region. Details are not described again in this embodiment of this application.

In some examples, when the electronic device includes a plurality of sound producing devices, the obtaining the first sound energy corresponding to the first audio data in the sound listening region and the second sound energy corresponding to the first audio data in the sound leakage region, and obtaining the third sound energy corresponding to the second audio data in the sound listening region and the fourth sound energy corresponding to the second audio data in the sound leakage region may include: separately obtaining sound energy corresponding to audio data that corresponds to each sound producing device in the sound listening region and sound energy corresponding to audio data that corresponds to each sound producing device in the sound leakage region.

Specifically, for a specific implementation of obtaining the first sound energy corresponding to the first audio data in the sound listening region and the second sound energy corresponding to the first audio data in the sound leakage region, and obtaining the third sound energy corresponding to the second audio data in the sound listening region and the fourth sound energy corresponding to the second audio data in the sound leakage region in this embodiment of this application, refer to the specific implementation in S604-S605. Details are not described again in this embodiment of this application.

S1105: Determine an audio optimization coefficient based on the first sound energy corresponding to the sound listening region, the second sound energy corresponding to the sound leakage region, the third sound energy corresponding to the sound listening region, and the fourth sound energy corresponding to the sound leakage region.

After the first sound energy corresponding to the sound listening region, the second sound energy corresponding to the sound leakage region, the third sound energy corresponding to the sound listening region, and the fourth sound energy corresponding to the sound leakage region are obtained, the audio optimization coefficient may be determined based on the first sound energy corresponding to the sound listening region, the second sound energy corresponding to the sound leakage region, the third sound energy corresponding to the sound listening region, and the fourth sound energy corresponding to the sound leakage region. The audio optimization coefficient may be used to reduce sound energy corresponding to third audio data that corresponds to the first sound producing device in the sound leakage region and sound energy corresponding to fourth audio data that corresponds to the second sound producing device in the sound leakage region.

The third audio data corresponding to the first sound producing device and the fourth audio data corresponding to the second sound producing device may be audio data output by the electronic device when the user actually uses the electronic device. To be specific, the third audio data corresponding to the first sound producing device is the audio data input by the electronic device to the first sound producing device when the user actually uses the electronic device, and the fourth audio data corresponding to the second sound producing device is the audio data input by the electronic device to the second sound producing device when the user actually uses the electronic device.

In some examples, the audio optimization coefficient may include a first optimization coefficient and a second optimization coefficient. The first optimization coefficient may be used to optimize a filter (such as a playback filter) corresponding to the first sound producing device, so that the sound energy corresponding to the third audio data corresponding to the first sound producing device in the sound leakage region can be reduced. The second optimization coefficient may be used to optimize a filter (such as a playback filter) corresponding to the second sound producing device, so that the sound energy corresponding to the fourth audio data corresponding to the second sound producing device in the sound leakage region can be reduced.

In some examples, the determining the first optimization coefficient based on the first sound energy corresponding to the sound listening region and the second sound energy corresponding to the sound leakage region may include: determining a first sound energy contrast between the first sound energy and the second sound energy. To be specific, the first sound energy contrast may be a ratio of the first sound energy to the second sound energy. Then, the first optimization coefficient is determined based on the first sound energy contrast. The first optimization coefficient may be accurately determined based on the first sound energy contrast between the sound energy corresponding to the sound listening region and the sound energy corresponding to the sound leakage region, so that the sound energy corresponding to the audio data in the sound leakage region can be reduced by using the first optimization coefficient.

In some examples, that the first optimization coefficient is determined based on the first sound energy contrast may include: determining a value corresponding to the maximum first sound energy contrast as the first optimization coefficient. Because the value corresponding to the maximum first sound energy contrast is determined as the first optimization coefficient, the sound energy corresponding to the audio data in the sound leakage region may be further reduced by using the first optimization coefficient.

In some examples, the determining the second optimization coefficient based on the third sound energy corresponding to the sound listening region and the fourth sound energy corresponding to the sound leakage region may include: determining a second sound energy contrast between the third sound energy and the fourth sound energy. To be specific, the second sound energy contrast may be a ratio of the third sound energy to the fourth sound energy. Then, the second optimization coefficient is determined based on the second sound energy contrast.

In some examples, that the second optimization coefficient is determined based on the second sound energy contrast may include: determining a value corresponding to the maximum second sound energy contrast as the second optimization coefficient.

It should be noted that when the electronic device includes a plurality of sound producing devices, the determining an audio optimization coefficient based on the first sound energy corresponding to the sound listening region, the second sound energy corresponding to the sound leakage region, the third sound energy corresponding to the sound listening region, and the fourth sound energy corresponding to the sound leakage region may include: determining an optimization coefficient of each sound producing device based on sound energy corresponding to each sound producing device in the sound listening region and sound energy corresponding to each sound producing device in the sound leakage region. In other words, the audio optimization coefficient includes optimization coefficients corresponding to a plurality of sound producing devices.

Specifically, for a specific implementation of determining the audio optimization coefficient based on the first sound energy corresponding to the sound listening region, the second sound energy corresponding to the sound leakage region, the third sound energy corresponding to the sound listening region, and the fourth sound energy corresponding to the sound leakage region in this embodiment of this application, refer to the specific implementation in S606. Details are not described again in this embodiment of this application.

S1106: Optimize, based on the first optimization coefficient, a first filter corresponding to the first sound producing device, and filter the third audio data by using the optimized first filter to obtain the filtered third audio data.

After the first optimization coefficient is determined, the first filter corresponding to the first sound producing device may be optimized based on the first optimization coefficient, so as to filter the third audio data by using the optimized first filter to obtain the filtered third audio data, so that the first sound producing device can output the filtered third audio data.

It should be noted that when the electronic device includes a plurality of sound producing devices, the electronic device includes a plurality of filters (which may also be referred to as playback filters), and the filters are in a one-to-one correspondence with the sound producing devices. The audio optimization coefficient includes optimization coefficients corresponding to a plurality of sound producing devices. That the first filter corresponding to the first sound producing device is optimized based on the first optimization coefficient, and the third audio data is filtered by using the optimized first filter to obtain the filtered third audio data may include: separately optimizing, based on the optimization coefficient corresponding to each sound producing device, the filter corresponding to each sound producing device, so as to filter the audio data corresponding to each sound producing device by using the optimized filter to obtain the filtered audio data, so that each sound producing device can separately output the corresponding filtered audio data.

Specifically, for a specific implementation of optimizing, based on the first optimization coefficient, the first filter corresponding to the first sound producing device, and filtering the third audio data by using the optimized first filter to obtain the filtered third audio data in this embodiment of this application, refer to the specific implementation in S607. Details are not described again in this embodiment of this application.

S1107: Optimize, based on the second optimization coefficient, a second filter corresponding to the second sound producing device, and filter the fourth audio data by using the optimized second filter to obtain the filtered fourth audio data.

After the second optimization coefficient is determined, the second filter corresponding to the second sound producing device may be optimized based on the second optimization coefficient, so as to filter the fourth audio data by using the optimized second filter to obtain the filtered fourth audio data, so that the second sound producing device can output the filtered fourth audio data.

In some examples, the use scenario in which the electronic device outputs the first audio data and the second audio data is the same as the use scenario in which the electronic device outputs the third audio data and the fourth audio data. Because the use scenario in which the electronic device outputs the first audio data and the second audio data is the same as the use scenario in which the electronic device outputs the third audio data and the fourth audio data, in the use scenario in which the electronic device outputs the third audio data and the fourth audio data, the audio optimization coefficient corresponding to the use scenario of the first audio data and the second audio data can be used to avoid a problem of sound leakage in the earpiece in the use scenario in which the electronic device outputs the third audio data and the fourth audio data, thereby preventing leakage of user privacy and improving security of user privacy.

Before the first filter corresponding to the first sound producing device is optimized based on the first optimization coefficient, and the second filter corresponding to the second sound producing device is optimized based on the second optimization coefficient, the electronic device may determine whether the use scenario in which the electronic device outputs the first audio data and the second audio data is the same as the use scenario in which the electronic device outputs the third audio data and the fourth audio data. In a case in which the use scenario in which the electronic device outputs the first audio data and the second audio data is the same as the use scenario in which the electronic device outputs the third audio data and the fourth audio data, the first filter corresponding to the first sound producing device may be optimized based on the first optimization coefficient, and the second filter corresponding to the second sound producing device may be optimized based on the second optimization coefficient.

In a case in which the use scenario in which the electronic device outputs the first audio data and the second audio data is different from the use scenario in which the electronic device outputs the third audio data and the fourth audio data, the electronic device may first obtain an audio optimization coefficient corresponding to the use scenario in which the third audio data and the fourth audio data are output, so that the filter is filtered by using the audio optimization coefficient corresponding to the use scenario in which the third audio data and the fourth audio data are output, and the third audio data and the fourth audio data are filtered by using the optimized filter to obtain the filtered third audio data and the filtered fourth audio data.

For a process in which the electronic device obtains the audio optimization coefficient corresponding to the use scenario in which the third audio data and the fourth audio data are output, refer to the process in which the electronic device obtains the audio optimization coefficient corresponding to the use scenario in which the first audio data and the second audio data are output in this application. Details are not described again in this embodiment of this application.

In some other examples, a frequency band in which the electronic device outputs the first audio data and the second audio data is the same as a frequency band in which the electronic device outputs the third audio data and the fourth audio data.

Before the first filter corresponding to the first sound producing device is optimized based on the first optimization coefficient, and the second filter corresponding to the second sound producing device is optimized based on the second optimization coefficient, the electronic device may determine whether the frequency band in which the electronic device outputs the first audio data and the second audio data is the same as the frequency band in which the electronic device outputs the third audio data and the fourth audio data. In a case in which the frequency band in which the electronic device outputs the first audio data and the second audio data is the same as the frequency band in which the electronic device outputs the third audio data and the fourth audio data, the first filter corresponding to the first sound producing device may be optimized based on the first optimization coefficient, and the second filter corresponding to the second sound producing device may be optimized based on the second optimization coefficient.

In a case in which the frequency band in which the electronic device outputs the first audio data and the second audio data is different from the frequency band in which the electronic device outputs the third audio data and the fourth audio data, the electronic device may first obtain an audio optimization coefficient corresponding to the frequency band in which the third audio data and the fourth audio data are output, so that the filter is filtered by using the audio optimization coefficient corresponding to the frequency band in which the third audio data and the fourth audio data are output, and the third audio data and the fourth audio data are filtered by using the optimized filter to obtain the filtered third audio data and the filtered fourth audio data.

It should be noted that in this embodiment of this application, an execution sequence of S1106 and S1107 is not limited. To be specific, S1106 may be performed before S1107, or S1107 may be performed before S1106, or S1106 and S1107 may be performed simultaneously. In this embodiment of this application, an example in which S1106 is performed before S1107 is used for description.

Specifically, for a specific implementation of optimizing, based on the second optimization coefficient, the second filter corresponding to the second sound producing device, and filtering the fourth audio data by using the optimized second filter to obtain the filtered fourth audio data in this embodiment of this application, refer to the specific implementation in S608. Details are not described again in this embodiment of this application.

S1108: Output the filtered third audio data by using the first sound producing device, and output the filtered fourth audio data by using the second sound producing device.

After the first filter corresponding to the first sound producing device is optimized based on the first optimization coefficient, and the third audio data is filtered by using the optimized first filter to obtain the filtered third audio data, and the second filter corresponding to the second sound producing device is optimized based on the second optimization coefficient, and the fourth audio data is filtered by using the optimized second filter to obtain the filtered fourth audio data, the electronic device may output the filtered third audio data by using the first sound producing device, and output the filtered fourth audio data by using the second sound producing device.

It should be noted that when the electronic device includes a plurality of sound producing devices, a plurality of filters are included. That the first filter corresponding to the first sound producing device is optimized based on the first optimization coefficient, and the third audio data is filtered by using the optimized first filter to obtain the filtered third audio data, and the second filter corresponding to the second sound producing device is optimized based on the second optimization coefficient, and the fourth audio data is filtered by using the optimized second filter to obtain the filtered fourth audio data may include: A filter corresponding to each sound producing device is optimized by using an optimization coefficient corresponding to the sound producing device, and the optimized filter filters audio data corresponding to the sound producing device, so as to obtain a plurality of pieces of filtered audio data. Then, the electronic device may output the corresponding filtered audio data by using each sound producing device.

It should be noted that when the electronic device includes a plurality of sound producing devices, the audio data output by using each sound producing device may be the same, or the audio data output by using each sound producing device may be different. This is not limited in this embodiment of this application.

According to the solution provided in this embodiment of this application, the audio optimization coefficient may be accurately determined based on the sound energy contrast between the sound energy corresponding to the sound listening region and the sound energy corresponding to the sound leakage region, so that the sound energy corresponding to the audio data in the sound leakage region can be reduced by using the audio optimization coefficient. In other words, before the electronic device outputs the audio data, the electronic device may perform optimization processing on the output audio data, so that sound energy corresponding to the output audio data in the sound leakage region is reduced. This can avoid a problem of sound leakage in the earpiece of the electronic device in the sound leakage region, thereby preventing leakage of user privacy and improving security of user privacy. In addition, the optimized playback filters may keep the sound energy of the sound listening region unchanged. In other words, in the solution of this application, the sound energy of the sound leakage region can be reduced while sound field playback can be implemented by using the at least two sound producing devices. In other words, the solution of this application can ensure auditory perception of the user while preventing sound leakage.

Corresponding to the method in the foregoing embodiment, an embodiment of this application further provides an audio processing apparatus. The audio processing apparatus may be applied to an electronic device, and is configured to implement the method in the foregoing embodiment. A function of the audio optimization apparatus may be implemented by using hardware, or may be implemented by executing corresponding software by hardware. The hardware or the software includes one or more modules corresponding to the foregoing function.

Figure 12:
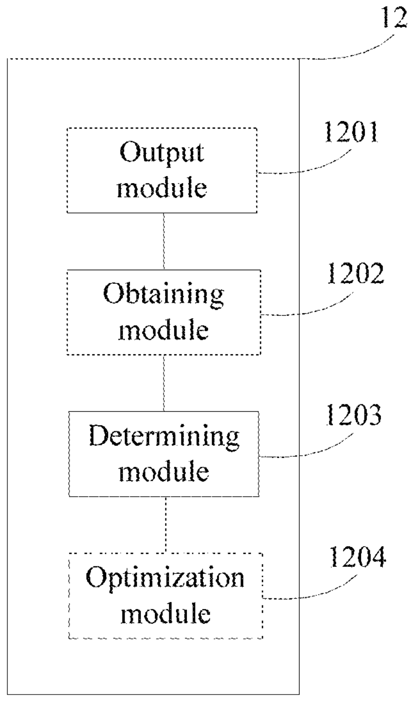
FIG. 12 is a schematic diagram of a structure of an audio processing apparatus according to an embodiment of this application.

For example, FIG. 12 is a schematic diagram of a structure of an audio processing apparatus 12. As shown in FIG. 12, the audio processing apparatus 12 may include an output module 1201, an obtaining module 1202, a determining module 1203, and the like.

The output module 1201 may be configured to output first audio data by using a first sound producing device, and output second audio data by using a second sound producing device.

The obtaining module 1202 may be configured to obtain first sound energy corresponding to the first audio data in a sound listening region and second sound energy corresponding to the first audio data in a sound leakage region, and obtain third sound energy corresponding to the second audio data in the sound listening region and fourth sound energy corresponding to the second audio data in the sound leakage region.

The determining module 1203 may be configured to determine an audio optimization coefficient based on the first sound energy corresponding to the sound listening region, the second sound energy corresponding to the sound leakage region, the third sound energy corresponding to the sound listening region, and the fourth sound energy corresponding to the sound leakage region, where the audio optimization coefficient is used to reduce sound energy corresponding to third audio data that corresponds to the first sound producing device in the sound leakage region and sound energy corresponding to fourth audio data that corresponds to the second sound producing device in the sound leakage region.

In another possible implementation, the determining module 1203 may be further configured to determine a first sound energy contrast between the first sound energy and the second sound energy.

The determining module 1203 may be further configured to determine a first optimization coefficient based on the first sound energy contrast.

The determining module 1203 may be further configured to determine a second sound energy contrast between the third sound energy and the fourth sound energy.

The determining module 1203 may be further configured to determine a second optimization coefficient based on the second sound energy contrast.

In another possible implementation, the determining module 1203 may be further configured to determine a value corresponding to the maximum first sound energy contrast as the first optimization coefficient.

The determining module 1203 may be further configured to determine a value corresponding to the maximum second sound energy contrast as the second optimization coefficient.

In another possible implementation, the obtaining module 1202 may be further configured to obtain a first transfer function corresponding to the first audio data in the sound listening region, and obtain a second transfer function corresponding to the first audio data in the sound leakage region.

The determining module 1203 may be further configured to determine, based on the first transfer function corresponding to the sound listening region, the first sound energy corresponding to the first audio data in the sound listening region.

The determining module 1203 may be further configured to determine, based on the second transfer function corresponding to the sound leakage region, the second sound energy corresponding to the first audio data in the sound leakage region.

In another possible implementation, the obtaining module 1202 may be further configured to obtain a transfer function of the first audio data at each sampling point in the sound listening region.

The determining module 1203 may be further configured to determine, based on the transfer function of the first audio data at each sampling point in the sound listening region, the first transfer function corresponding to the first audio data in the sound listening region.

The obtaining module 1202 may be further configured to obtain a transfer function of the first audio data at each sampling point in the sound leakage region.

The determining module 1203 may be further configured to determine, based on the transfer function of the first audio data at each sampling point in the sound leakage region, the second transfer function corresponding to the first audio data in the sound leakage region.

In another possible implementation, the determining module 1203 may be further configured to determine a weight corresponding to each sampling point in the sound listening region.

The determining module 1203 may be further configured to determine, based on the weight corresponding to each sampling point in the sound listening region and the transfer function of each sampling point in the sound listening region, the first transfer function corresponding to the first audio data in the sound listening region.

In another possible implementation, the audio processing apparatus 12 may further include an optimization module 1204. The optimization module 1204 may be configured to optimize, based on the first optimization coefficient, a first filter corresponding to the first sound producing device, and filter the third audio data by using the optimized first filter to obtain the filtered third audio data.

The optimization module 1204 may be further configured to optimize, based on the second optimization coefficient, a second filter corresponding to the second sound producing device, and filter the fourth audio data by using the optimized second filter to obtain the filtered fourth audio data.

The output module 1201 may be further configured to output the filtered third audio data by using the first sound producing device, and output the filtered fourth audio data by using the second sound producing device.

In another possible implementation, the determining module 1203 may be further configured to determine a use scenario in which the electronic device outputs the first audio data and the second audio data.

The determining module 1203 may be further configured to determine the sound listening region and the sound leakage region based on the use scenario of the first audio data and the second audio data.

In another possible implementation, a use scenario of the third audio data and the fourth audio data is the same as the use scenario of the first audio data and the second audio data.

In another possible implementation, the at least two sound producing devices include at least one of an earpiece of the electronic device, a speaker of the electronic device, or a screen sound producing apparatus of the electronic device.

In another possible implementation, the first sound producing device is the earpiece of the electronic device, and the second sound producing device is the screen sound producing apparatus of the electronic device.

It should be understood that division of units or modules (referred to as units in the following) in the apparatus is merely logical function division. In an actual implementation, all or some of the units or modules may be integrated into one physical entity, or may be physically separated. In addition, the units in the apparatus may be all implemented in a form of software invoked by a processing element or may be all implemented in a form of hardware, or some units may be implemented in a form of software invoked by a processing element and some units are implemented in a form of hardware.

For example, the units may be separately disposed processing elements, or may be integrated into a specific chip in the apparatus for implementation. In addition, the units may alternatively be stored in a memory in a form of a program, and invoked by a specific processing element of the apparatus to perform functions of the units. In addition, all or some of these units may be integrated together, or may be implemented independently. The processing element described herein may also be referred to as a processor, and may be an integrated circuit that has a signal processing capability. In an implementation process, the steps in the foregoing method or the foregoing units may be implemented by using a hardware integrated logic circuit in a processor element, or may be implemented by software invoked by the processing element.

In one example, the units in the foregoing apparatus may be one or more integrated circuits configured to implement the foregoing method, for example, one or more ASICs, one or more DSPs, one or more FPGAs, or a combination of at least two of these integrated circuit forms.

For another example, when the units in the apparatus may be implemented by scheduling a program by using the processing element, the processing element may be a general-purpose processor, for example, a CPU or another processor that can invoke the program. For another example, these units may be integrated together and implemented in a form of a system on chip SOC.

In an implementation, the units that are in the foregoing apparatus and that implement corresponding steps in the foregoing method may be implemented in a form of scheduling a program by using the processing element. For example, the apparatus may include a processing element and a storage element, and the processing element invokes a program stored in the storage element to perform the method described in the foregoing method embodiment. The storage element may be a storage element that is on a same chip as the processing element, namely, an on-chip storage element.

In another implementation, the program used to perform the foregoing method may be on a storage element that is located on a different chip from the processing element, namely, an off-chip storage element. In this case, the processing element invokes or loads the program from the off-chip storage element onto the on-chip storage element, to invoke and perform the method described in the foregoing method embodiment.

For example, an embodiment of this application may further provide an apparatus, for example, an electronic device. The electronic device may include a processor and a memory configured to store instructions executable by the processor. The processor is configured to enable, when executing the instructions, the electronic device to implement the audio processing method according to the foregoing embodiments. The memory may be located inside the electronic device or may be located outside the electronic device. In addition, there are one or more processors.

In still another implementation, the units that are in the apparatus and that implement the steps in the foregoing method may be configured as one or more processing elements, and these processing elements may be disposed on the corresponding electronic device described above. The processing elements herein may be integrated circuits, for example, one or more ASICs, one or more DSPs, one or more FPGAs, or a combination of these types of integrated circuits. These integrated circuits may be integrated together to form a chip.

For example, an embodiment of this application further provides a chip, and the chip may be applied to the foregoing electronic device. The chip includes one or more interface circuits and one or more processors. The interface circuit and the processor are interconnected by using a line. The processor receives computer instructions from the memory of the electronic device through the interface circuit and executes the computer instructions, to implement the method described in the foregoing method embodiment.

An embodiment of this application further provides a computer program product, including the computer instructions run by the electronic device.

Through the descriptions of the foregoing implementations, a person skilled in the art may clearly understand that, for the purpose of convenient and brief description, only division of the foregoing functional modules is used as an example for description. In actual application, the functions may be allocated to and completed by different functional modules based on a requirement. In other words, an internal structure of the apparatus is divided into different functional modules, to complete all or some of the functions described above.

In the several embodiments provided in this application, it should be understood that the disclosed apparatus and method may be implemented in another manner. For example, the apparatus embodiments described above are merely examples. For example, division into modules or units is merely logical function division. In actual implementation, there may be another division manner. For example, a plurality of units or components may be combined or integrated into another apparatus, or some features may be ignored or not performed. In addition, the displayed or discussed mutual couplings, direct couplings, or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may be one or more physical units, in other words, may be located in one place, or may be distributed in a plurality of different places.

Some or all of the units may be selected based on actual requirements to achieve the objectives of the solutions in the embodiments.

In addition, the functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the conventional technology, or all or some of the technical solutions may be implemented in a form of a software product, for example, a program. The software product is stored in a program product, for example, a computer-readable storage medium, including several instructions for instructing a device (which may be a single-chip microcomputer, a chip, or the like) or a processor (processor) to perform all or some of the steps of the method in the embodiments of this application. The storage medium includes any medium that can store program code, for example, a USB flash drive, a removable hard disk, a ROM, a RAM, a magnetic disk, or an optical disc.

For example, an embodiment of this application may further provide a computer-readable storage medium, and the computer-readable storage medium stores computer program instructions. When the computer program instructions are executed by an electronic device, the electronic device is enabled to implement the audio processing method described in the foregoing method embodiment.

The foregoing descriptions are merely specific implementations of this application, but are not intended to limit the protection scope of this application. Any change or replacement made within the technical scope disclosed in this application shall fall within the protection scope of this application. Therefore, the protection scope of this application shall be subject to the protection scope of the claims.

The invention claimed is:

1. An audio processing method, applied to an electronic device, wherein the electronic device comprises at least two sound producing devices, the at least two sound producing devices comprise a first sound producing device and a second sound producing device, and the method comprises:

outputting first audio data by using the first sound producing device, and outputting second audio data by using the second sound producing device;

obtaining first sound energy corresponding to the first audio data in a sound listening region and second sound energy corresponding to the first audio data in a sound leakage region, and obtaining third sound energy corresponding to the second audio data in the sound listening region and fourth sound energy corresponding to the second audio data in the sound leakage region; and determining an audio optimization coefficient based on the first sound energy corresponding to the sound listening region, the second sound energy corresponding to the sound leakage region, the third sound energy corresponding to the sound listening region, and the fourth sound energy corresponding to the sound leakage region, wherein the audio optimization coefficient is used to reduce sound energy corresponding to third audio data that corresponds to the first sound producing device in the sound leakage region and sound energy corresponding to fourth audio data that corresponds to the second sound producing device in the sound leakage region.

2. The method according to claim 1, wherein the audio optimization coefficient comprises a first optimization coefficient and a second optimization coefficient, and the determining an audio optimization coefficient based on the first sound energy corresponding to the sound listening region, the second sound energy corresponding to the sound leakage region, the third sound energy corresponding to the sound listening region, and the fourth sound energy corresponding to the sound leakage region comprises:

determining a first sound energy contrast between the first sound energy and the second sound energy;

determining the first optimization coefficient based on the first sound energy contrast;

determining a second sound energy contrast between the third sound energy and the fourth sound energy; and determining the second optimization coefficient based on the second sound energy contrast.

3. The method according to claim 2, wherein the determining the first optimization coefficient based on the first sound energy contrast comprises:

determining a value corresponding to the maximum first sound energy contrast as the first optimization coefficient; and the determining the second optimization coefficient based on the second sound energy contrast comprises:

determining a value corresponding to the maximum second sound energy contrast as the second optimization coefficient.

4. The method according to claim 3, wherein the obtaining first sound energy corresponding to the first audio data in a sound listening region and second sound energy corresponding to the first audio data in a sound leakage region comprises:

obtaining a first transfer function corresponding to the first audio data in the sound listening region, and obtaining a second transfer function corresponding to the first audio data in the sound leakage region;

determining, based on the first transfer function corresponding to the sound listening region, the first sound energy corresponding to the first audio data in the sound listening region; and determining, based on the second transfer function corresponding to the sound leakage region, the second sound energy corresponding to the first audio data in the sound leakage region.

5. The method according to claim 4, wherein the obtaining a first transfer function corresponding to the first audio data in the sound listening region comprises:

obtaining a transfer function of the first audio data at each sampling point in the sound listening region; and determining, based on the transfer function of the first audio data at each sampling point in the sound listening region, the first transfer function corresponding to the first audio data in the sound listening region; and the obtaining a second transfer function corresponding to the first audio data in the sound leakage region comprises:

obtaining a transfer function of the first audio data at each sampling point in the sound leakage region; and determining, based on the transfer function of the first audio data at each sampling point in the sound leakage region, the second transfer function corresponding to the first audio data in the sound leakage region.

6. The method according to claim 5, wherein the determining, based on the transfer function of the first audio data at each sampling point in the sound listening region, the first transfer function corresponding to the first audio data in the sound listening region comprises:

determining a weight corresponding to each sampling point in the sound listening region; and determining, based on the weight corresponding to each sampling point in the sound listening region and the transfer function of each sampling point in the sound listening region, the first transfer function corresponding to the first audio data in the sound listening region.

7. The method according to claim 3, wherein the method further comprises:

optimizing, based on the first optimization coefficient, a first filter corresponding to the first sound producing device to obtain an optimized first filter, and filtering the third audio data by using the optimized first filter to obtain a filtered third audio data;

optimizing, based on the second optimization coefficient, a second filter corresponding to the second sound producing device to obtain an optimized second filter, and filtering the fourth audio data by using the optimized second filter to obtain a filtered fourth audio data; and outputting the filtered third audio data by using the first sound producing device, and outputting the filtered fourth audio data by using the second sound producing device.

8. The method according to claim 3, wherein before the obtaining first sound energy corresponding to the first audio data in a sound listening region and second sound energy corresponding to the first audio data in a sound leakage region, and obtaining third sound energy corresponding to the second audio data in the sound listening region and fourth sound energy corresponding to the second audio data in the sound leakage region, the method further comprises:

determining a use scenario in which the electronic device outputs the first audio data and the second audio data; and determining the sound listening region and the sound leakage region based on the use scenario of the first audio data and the second audio data.

9. The method according to claim 2, wherein the method further comprises:

optimizing, based on the first optimization coefficient, a first filter corresponding to the first sound producing device to obtain an optimized first filter, and filtering the third audio data by using the optimized first filter to obtain a filtered third audio data;

optimizing, based on the second optimization coefficient, a second filter corresponding to the second sound producing device to obtain an optimized second filter, and filtering the fourth audio data by using the optimized second filter to obtain a filtered fourth audio data; and outputting the filtered third audio data by using the first sound producing device, and outputting the filtered fourth audio data by using the second sound producing device.

10. The method according to claim 2, wherein the obtaining first sound energy corresponding to the first audio data in a sound listening region and second sound energy corresponding to the first audio data in a sound leakage region comprises:

obtaining a first transfer function corresponding to the first audio data in the sound listening region, and obtaining a second transfer function corresponding to the first audio data in the sound leakage region;

determining, based on the first transfer function corresponding to the sound listening region, the first sound energy corresponding to the first audio data in the sound listening region; and determining, based on the second transfer function corresponding to the sound leakage region, the second sound energy corresponding to the first audio data in the sound leakage region.

11. The method according to claim 2, wherein before the obtaining first sound energy corresponding to the first audio data in a sound listening region and second sound energy corresponding to the first audio data in a sound leakage region, and obtaining third sound energy corresponding to the second audio data in the sound listening region and fourth sound energy corresponding to the second audio data in the sound leakage region, the method further comprises:

determining a use scenario in which the electronic device outputs the first audio data and the second audio data; and determining the sound listening region and the sound leakage region based on the use scenario of the first audio data and the second audio data.

12. The method according to claim 1, wherein the obtaining first sound energy corresponding to the first audio data in a sound listening region and second sound energy corresponding to the first audio data in a sound leakage region comprises:

obtaining a first transfer function corresponding to the first audio data in the sound listening region, and obtaining a second transfer function corresponding to the first audio data in the sound leakage region;

determining, based on the first transfer function corresponding to the sound listening region, the first sound energy corresponding to the first audio data in the sound listening region; and determining, based on the second transfer function corresponding to the sound leakage region, the second sound energy corresponding to the first audio data in the sound leakage region.

13. The method according to claim 12, wherein the obtaining a first transfer function corresponding to the first audio data in the sound listening region comprises:

obtaining a transfer function of the first audio data at each sampling point in the sound listening region; and determining, based on the transfer function of the first audio data at each sampling point in the sound listening region, the first transfer function corresponding to the first audio data in the sound listening region; and the obtaining a second transfer function corresponding to the first audio data in the sound leakage region comprises:

obtaining a transfer function of the first audio data at each sampling point in the sound leakage region; and determining, based on the transfer function of the first audio data at each sampling point in the sound leakage region, the second transfer function corresponding to the first audio data in the sound leakage region.

14. The method according to claim 13, wherein the determining, based on the transfer function of the first audio data at each sampling point in the sound listening region, the first transfer function corresponding to the first audio data in the sound listening region comprises:

determining a weight corresponding to each sampling point in the sound listening region; and determining, based on the weight corresponding to each sampling point in the sound listening region and the transfer function of each sampling point in the sound listening region, the first transfer function corresponding to the first audio data in the sound listening region.

15. The method according to claim 1, wherein before the obtaining first sound energy corresponding to the first audio data in a sound listening region and second sound energy corresponding to the first audio data in a sound leakage region, and obtaining third sound energy corresponding to the second audio data in the sound listening region and fourth sound energy corresponding to the second audio data in the sound leakage region, the method further comprises:

determining a use scenario in which the electronic device outputs the first audio data and the second audio data; and determining the sound listening region and the sound leakage region based on the use scenario of the first audio data and the second audio data.

16. The method according to claim 15, wherein a use scenario of the third audio data and the fourth audio data is the same as the use scenario of the first audio data and the second audio data.

17. The method according to claim 1, wherein the at least two sound producing devices comprise at least one of an earpiece of the electronic device, a speaker of the electronic device, or a screen sound producing apparatus of the electronic device.

18. The method according to claim 17, wherein the first sound producing device is the earpiece of the electronic device, and the second sound producing device is the screen sound producing apparatus of the electronic device.

19. An electronic device, wherein the electronic device comprises at least two sound producing devices, a processor and a memory configured to store instructions executable by the processor, the at least two sound producing devices comprise a first sound producing device and a second sound producing device; and when the processor is configured to execute the instructions, the electronic device is enabled to implement the method comprising:

outputting first audio data by using the first sound producing device, and outputting second audio data by using the second sound producing device;

obtaining first sound energy corresponding to the first audio data in a sound listening region and second sound energy corresponding to the first audio data in a sound leakage region, and obtaining third sound energy corresponding to the second audio data in the sound listening region and fourth sound energy corresponding to the second audio data in the sound leakage region; and determining an audio optimization coefficient based on the first sound energy corresponding to the sound listening region, the second sound energy corresponding to the sound leakage region, the third sound energy corresponding to the sound listening region, and the fourth sound energy corresponding to the sound leakage region, wherein the audio optimization coefficient is used to reduce sound energy corresponding to third audio data that corresponds to the first sound producing device in the sound leakage region and sound energy corresponding to fourth audio data that corresponds to the second sound producing device in the sound leakage region.

20. A non-transitory computer-readable storage medium, wherein the computer-readable storage medium stores computer program instructions; and when the computer program instructions are executed by an electronic device, wherein the electronic device comprises at least two sound producing devices, the at least two sound producing devices comprise a first sound producing device and a second sound producing device, the electronic device is enabled to implement the method comprising:

outputting first audio data by using the first sound producing device, and outputting second audio data by using the second sound producing device;

obtaining first sound energy corresponding to the first audio data in a sound listening region and second sound energy corresponding to the first audio data in a sound leakage region, and obtaining third sound energy corresponding to the second audio data in the sound listening region and fourth sound energy corresponding to the second audio data in the sound leakage region; and determining an audio optimization coefficient based on the first sound energy corresponding to the sound listening region, the second sound energy corresponding to the sound leakage region, the third sound energy corresponding to the sound listening region, and the fourth sound energy corresponding to the sound leakage region, wherein the audio optimization coefficient is used to reduce sound energy corresponding to third audio data that corresponds to the first sound producing device in the sound leakage region and sound energy corresponding to fourth audio data that corresponds to the second sound producing device in the sound leakage region.

* * * * *